US006886029B1

(12) United States Patent
Pecus et al.

(10) Patent No.: US 6,886,029 B1
(45) Date of Patent: Apr. 26, 2005

(54) END TO END SIMULATION OF A CONTENT DELIVERY SYSTEM

(75) Inventors: Vivian Pecus, Falls Church, VA (US); Christopher Benden, Woodford, VA (US); David Lynn Bullock, Conyers, GA (US); Philip C. Lausier, Canton, GA (US); Mark Russell Kalmbach, Round Rock, TX (US); Lucy M. Smith, Springfield, VA (US)

(73) Assignee: Panamsat Corporation, Wilton, CT (US)

( * ) Notice: Subject to any disclaimer, the term of this patent is extended or adjusted under 35 U.S.C. 154(b) by 768 days.

(21) Appl. No.: 09/960,603

(22) Filed: Sep. 21, 2001

Related U.S. Application Data

(60) Provisional application No. 60/275,779, filed on Mar. 13, 2001, provisional application No. 60/275,780, filed on Mar. 13, 2001, provisional application No. 60/275,781, filed on Mar. 13, 2001, provisional application No. 60/275,782, filed on Mar. 13, 2001, provisional application No. 60/275,783, filed on Mar. 13, 2001, provisional application No. 60/275,804, filed on Mar. 13, 2001, provisional application No. 60/275,813, filed on Mar. 13, 2001, provisional application No. 60/275,815, filed on Mar. 13, 2001, provisional application No. 60/275,816, filed on Mar. 13, 2001, provisional application No. 60/275,817, filed on Mar. 13, 2001, provisional application No. 60/275,825, filed on Mar. 13, 2001, provisional application No. 60/275,826, filed on Mar. 13, 2001, provisional application No. 60/275,827, filed on Mar. 13, 2001, provisional application No. 60/275,838, filed on Mar. 13, 2001, and provisional application No. 60/275,795, filed on Mar. 13, 2001.

(51) Int. Cl.[7] .............................................. G06F 15/16
(52) U.S. Cl. ...................... 709/203; 709/230; 709/231; 709/246; 709/217; 709/218; 709/219; 455/12.1; 455/13.1; 455/427; 455/430; 725/37; 725/48; 725/105; 703/21; 714/712
(58) Field of Search ................................ 709/201–203, 709/217–219, 230–231, 246; 455/12.1, 13.1; 703/21; 714/712; 725/37, 48, 105–106

(56) References Cited

U.S. PATENT DOCUMENTS

| 5,553,083 | A | | 9/1996 | Miller |
| 5,557,320 | A | | 9/1996 | Krebs |
| 5,583,561 | A | | 12/1996 | Baker et al. |
| 5,594,490 | A | | 1/1997 | Dawson et al. |
| 5,727,002 | A | | 3/1998 | Miller et al. |
| 5,793,973 | A | | 8/1998 | Birdwell et al. |
| 5,920,701 | A | | 7/1999 | Miller et al. |
| 5,956,716 | A | | 9/1999 | Kenner et al. |
| 5,963,551 | A | | 10/1999 | Minko |
| 5,978,567 | A | | 11/1999 | Rebane et al. |
| 5,983,005 | A | * | 11/1999 | Monteiro et al. ........... 709/231 |
| 5,987,233 | A | | 11/1999 | Humphrey |
| 5,987,518 | A | | 11/1999 | Gotwald |
| 5,991,306 | A | | 11/1999 | Burns et al. |
| 6,002,720 | A | | 12/1999 | Yurt et al. |
| 6,002,852 | A | | 12/1999 | Birdwell et al. |
| 6,003,030 | A | | 12/1999 | Kenner et al. |
| 6,792,615 | B1 | * | 9/2004 | Rowe et al. .................. 725/37 |
| 6,810,413 | B1 | * | 10/2004 | Rajakarunanayake et al. ... 709/203 |

* cited by examiner

Primary Examiner—Jack D. Harvey
Assistant Examiner—Hieu C. Le
(74) Attorney, Agent, or Firm—David A. Loenenstein

(57) ABSTRACT

A method for testing upgrades and modifications to a first transmission network by providing a second internet transmission network including components that duplicate or simulate one or more of the components of the first network. The second network duplicates the functionality and configuration of the first network thereby permitting modifications to be installed and tested on the second network prior to installing them on the first transmission network. This in turn allows "bugs" to be found and eliminated before modifications are used on the first network. The invention also allows error signals to be injected to enable operators to compensate for and to avoid these errors before they appear on the first network.

16 Claims, 11 Drawing Sheets

END TO END SIMULATION OF A CONTENT DELIVERY SYSTEM

CROSS-REFERENCE TO RELATED APPLICATIONS

This application claims priority from the following fifteen provisional United States Patent Applications:

Ser. No. 60/275,779 entitled INTEGRATED NETWORK MANAGEMENT SYSTEM USING HARMONIC ELEMENT MANAGERS IN A CONTENT DELIVERY SYSTEM filed on Mar. 13, 2001;

Ser. No. 60/275,780 entitled FILE NAMING SYSTEM WITH TRACKING AND DIAGNOSTIC FEATURES IN A CONTENT DELIVERY SYSTEM, filed on Mar. 13, 2001;

Ser. No. 60/275,781 entitled ARCHITECTURE FOR DELIVERING VIDEO AND OTHER CONTENT AT HIGH BANDWIDTHS USING NOCs, SATELLITES, AND EDGE NODES TO INTERNET USERS, filed on Mar. 13, 2001;

Ser. No. 60/275,782 entitled MOBILE NODE FOR SATELLITE BASED CONTENT DELIVERY SYSTEM, filed on Mar. 13, 2001;

Ser. No. 60/275,783 entitled EDGE NODE ARRANGEMENT IN A SATELLITE BASED CONTENT DELIVERY SYSTEM FOR INTERNET USERS, filed on Mar. 13, 2001;

Ser. No. 60/275,804, entitled SCALABLE IP ADDRESSING SCHEME FOR MULTIPLE NOCs AND EDGE NODES, filed on Mar. 13, 2001;

Ser. No. 60/275,813 entitled DEMONSTRATION NODE IN A SATELLITE BASED CONTENT DELIVERY SYSTEM, filed on Mar. 13, 2001;

Ser. No. 60/275,815 entitled GLOBAL OR MULTIREGION CONTENT DELIVERY SYSTEM AND METHOD USING NOCs AND ADAPTED EDGE NODES, filed on Mar. 13, 2001;

Ser. No. 60/275,816 entitled END TO END SIMULATION OF A CONTENT DELIVERY SYSTEM HAVING A NOC, SATELLITE, AND EDGE MODE ARCHITECTURE, filed on Mar. 13, 2001;

Ser. No. 60/275,817 entitled LARGE EDGE NODE FOR SIMULTANEOUS VIDEO ON DEMAND AND LIVE STREAMING OF SATELLITE DELIVERED CONTENT, filed on Mar. 13, 2001;

Ser. No. 60/275,825 entitled MOBILE NOC FOR SATELLITE BASED CONTENT DELIVERY SYSTEM, filed on Mar. 13, 2001;

Ser. No. 60/275,826 entitled SCALABLE EDGE NODE WITH ACCESS TO SHARED DRIVER IN A SATELLITE BASED CONTENT DELIVERY SYSETM, filed on Mar. 13, 2001;

Ser. No. 60/275,827 entitled NOC ARCHITECUTRE IN A HIGH BANDWIDTH SATELLITE BASED VIDEO DELIVERY SYSTEM FOR INTERNET USERS, filed on Mar. 13, 2001;

Ser. No. 60/275,838 entitled FORWARD CACHE MANAGEMENT BETWEEN EDGE NODES IN A SATELLITE BASED CONTENT DELIVERY SYSTEM, filed on Mar. 13, 2001; and Ser. No. 60/275,795 entitled MICRONODE IN A SATELLITE BASED CONTENT DELIVERY SYSTEM, filed on Mar. 13, 2001.

The entirety of each of the preceding provisional United States patent applications are incorporated by reference herein.

This application is related to the following fourteen co-pending United States utility patent applications that were all filed by inventors Vivian Pecus, Christopher Benden, David L. Bullock, Philip Lausier, Mark Kalmbach, and Aaron D. Falk on Sep. 20, 2001 together with this application:

The United States utility patent application entitled ARCHITECTURE FOR DELIVERING VIDEO AND OTHER DATA AT HIGH BANDWIDTHS;

The United States utility patent application entitled NETWORK OPERATION CENTER ARCHITECTURE IN A HIGH BANDWIDTH SATELLITE BASED DATA DELIVERY SYSTEM FOR INTERNET USERS;

The United States utility patent application entitled EDGE NODE ARRANGEMENT IN A SATELLITE BASED CONTENT DELIVERY SYSTEM FOR INTERNET USERS;

The United States utility patent application entitled LARGE EDGE NODE FOR SIMULTANEOUS VIDEO ON DEMAND AND LIVE STREAMING OF SATELLITE DELIVERED CONTENT;

The United States utility patent application entitled INTEGRATED NETWORK MANAGEMENT SYSTEM;

The United States utility patent application entitled MOBILE NETWORK OPERATION CENTER FOR SATELLITE BASED CONTENT DELIVERY SYSTEM;

The United States utility patent application entitled SELF-CONTAINED DEMONSTRATION NODE IN A SATELLITE BASED CONTENT DELIVERY SYSTEM;

The United States utility patent application entitled SCALABLE IP ADDRESSING SCHEME FOR MULTIPLE NOCS AND EDGE NODES;

The United States utility patent application entitled MOBILE NODE FOR SATELLITE BASED CONTENT DELIVERY SYSTEM;

The United States utility patent application entitled SCALABLE EDGE NODE;

The United States utility patent application entitled GLOBAL OR MULTI-REGION CONTENT DELIVERY SYSTEM;

The United States utility patent application entitled MICRONODE IN A SATELLITE BASED CONTENT DELIVERY SYSTEM;

The United State utility patent application entitled IMPROVED FILE NAME SYSTEM WITH TRACKING AND DIAGNOSTIC FEATURES IN A CONTENT DELIVERY SYSTEM; and The United States utility patent application entitled FORWARD CACHE MANAGEMENT BETWEEN EDGE NODES IN A SATELLITE BASED CONTENT DELIVERY SYSTEM.

Each of the preceding fifteen United States utility patent applications are incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to a method and system for delivering multimedia data to internet users at high bandwidths using a satellite communication link or links.

BACKGROUND OF THE INVENTION

As the popularity of the internet increases, there is a commensurate increase in the need to deliver content over large distances through congested, slow internet connections. This problem is particularly critical for files that must be delivered in a real time or near real time sequence, such as audio and video files, and for files that must be delivered at the same time to a multiplicity of places.

Additionally, there is a convergence of television/radio broadcast and internet data transmission, using streaming. The dividing line between computer technology and television/radio broadcast is rapidly diminishing. "Streaming" refers to transmitting video and audio information via the internet to personal computers in the home and office environment such that the information may be viewed or heard, or both, as it is being received. Currently, over 100,000 websites and over 60% of top entertainment, sports and news sites stream content through the internet.

The streaming experience in the internet, however, generally has been a disappointment for viewers until now. Choppy, postage-stamp sized images, and bad buffering due to the congestion and packet loss of land-based internet networks have been major obstacles for streaming multimedia through the internet. Early attempts at streaming video and audio have been marred by low bandwidth internet connections and network congestion. For example, the average stream traverses 20 hops through loosely managed public peering points before reaching end users. Congestion on the internet routers delays delivery of streaming media to the final destination, resulting in choppy, disjointed video.

Recent advances in last mile service providers have made high speed internet access available to the general public through the use of digital subscriber line (DSL), ISDN, cable modem and satellite modem technology. As the technology becomes more affordable and mature, most internet access can be expected to be high speed solving the low bandwidth problem of internet connections by internet users. However, the network congestion problem has not been improved as expected because internet backbone routing systems have not caught up with the drastic increase of internet traffic.

BRIEF SUMMARY OF THE INVENTION

The above-identified problems are solved and a technical advance is achieved by a system of internet broadcasting in which multimedia content is delivered to internet users bypassing most internet backbone.

An exemplary system includes: a NOC for receiving the multimedia content from the content provider and for modifying the format of the multimedia content into a first streaming format and a format suitable for satellite transmission; and an edge node, having a satellite communication link with the NOC and a direct connection to a last mile service provider that provides internet connection to the internet user, where the edge node receives the modified multimedia content from the NOC via the satellite communication link and delivers the modified multimedia content to the internet user via the last mile service provider according to a second streaming format that is compatible with the first streaming format. In an embodiment of the invention, the second streaming format is identical to the first streaming format.

Furthermore, the system described above may be tested by first providing a second system that comprises: (1) duplicates of one or more of the NOC, the edge node, the satellite communication link, the last mile service provider, or the Internet user of the first system; and (2) simulations of one or more of the NOC, the edge node, the satellite communication link, the last mile service provider, or the Internet user of the first IBN for which the second system does not have a duplicate. Then, the first system may be tested by simulating the operation of the first system using the second system since the second system duplicates the functionality and configuration of the first system. This enables the first system to be tested without interfering with the operation of the first system.

Other and further aspects of the present invention will become apparent during the course of the following detailed description and by reference to the attached drawings.

DETAILED DESCRIPTION OF THE PREFERRED EMBODIMENTS

Figure 1:
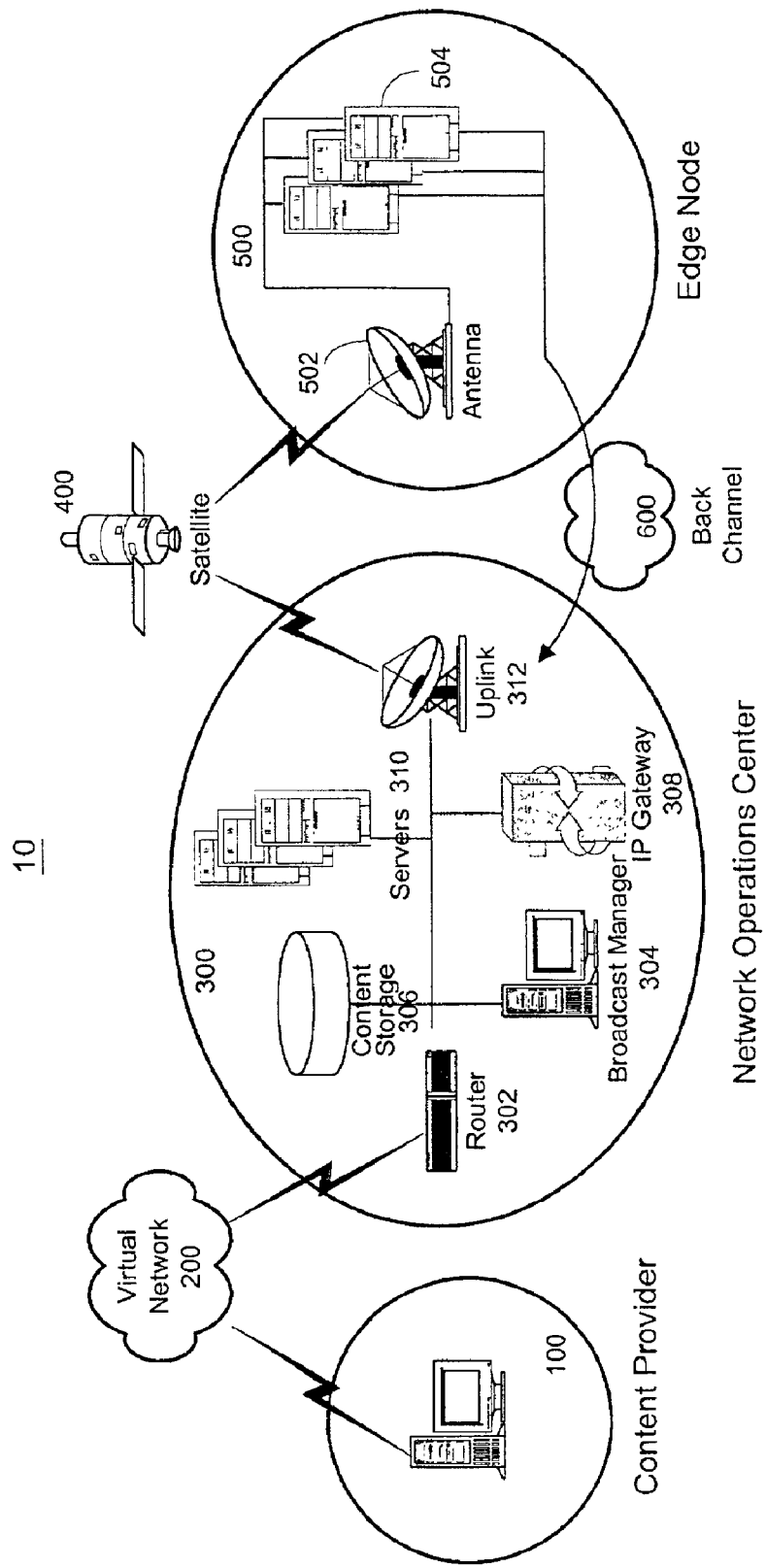
FIG. 1 is a diagram that shows a high-level overview of an internet broadcast network of the present invention.

The method and system of the present invention regard an internet broadcast network in which multimedia content is delivered from content providers to internet users without degradation. The internet broadcast network allows the content providers to bypass most internet congestion points by utilizing a hybrid of satellites and powerful land-based edge nodes of the internet broadcast network.

Streaming video and audio in the internet enable end users to receive and display or listen to multimedia content that are being broadcast in real time via the internet. It is different from file transfer services in that it is not necessary for the end users to receive the entire transmission before initiating playback on a personal computer. It is most similar to broadcast television and radio services, except that the delivery medium is the internet.

Multimedia content (e.g., movies, news, weather, sports, etc.) prepared by a content provider and ready to transmit via the internet are first received at a NOC of the internet broadcasting network. The multimedia content may or may not be an IP format. However, if the content is not in an IP format, the NOC may convert the content into an IP format. After processing, the NOC sends the multimedia content to a land-based edge node via a satellite link, thereby bypassing internet backbone, which usually causes congestion. The edge node is connected to a last mile service provider which has internet connections to end users (e.g., DSL, ISDN, cable modem, wireless modem, etc.). After reception, multimedia content is streamed from the edge node to the internet users' computers through the last mile service provider.

The following three services are basic services that the internet broadcasting network ("IBN") may offer to the content providers and end users: (1) a continual streaming service for continuous internet streaming applications, such as a whole day's news feed. IBN transports content from the source location to one or more of satellite broadcast gateways of NOC. The content is then broadcast to locations specified by the content provider; (2) special events and regular scheduled streaming service includes the initial internet broadcast of an event and extends to post event servicing of on-demand streams. Streams may be requested by individual users after an event has occurred and while demand remains high. The period of time for when an event will be available to users will be specified by the content providers or last mile service providers ("LMSPs"). This service is for live, one-time, short-term, and regularly scheduled streams such as sporting events and concerts; and (3) on-demand streaming is used for streams, such as music videos, video or audio clips, internet films, and downloadable files.

The method and system of the present invention provide internet users with high fidelity streaming multimedia content without degradation caused by clogging and delaying from the internet backbone. Internet users connected to one of the LMSPs would receive high quality streaming multimedia data with the internet broadcasting network of the present invention.

Overall Architecture

FIG. 1 shows a high-level overview of the internet broadcast network ("IBN") 10 of the present invention, illustrating the overall relationships between the network elements. IBN 10 may comprise a content provider (CP) 100 (although many content providers can be linked to this network), a virtual network (VN) 200, a network operation center (NOC) 300, a satellite 400, an edge node (EN) 500, and a back channel (BC) 600. Multimedia content generated by CP 100 is sent to NOC 300 via VN 200. The content is processed in NOC 300 and uploaded to satellite 400. Subsequently, satellite 400 downloads the content to EN 500. EN 500 is connected to a last mile service provider (LMSP) (not shown) such as a DSL, ISDN, cable modem, wireless modem, POTS, or any other type of internet Service Provider ("ISP"). The downloaded content in EN 500 may be delivered to end users (e.g., subscribers to CP 100) connected to the LMSP, e.g., with a high bandwidth link, thereby bypassing most of the internet backbone that may cause delay. BC 600 is a secondary land-based communication link for a back up between and NOC 300 and EN 500. BC 600 may be used for remote control of EN 500 by sending control messages from NOC 300 or sending control signals from EN 500 to NOC 300.

Content Provider

CP 100 provides multimedia content to NOC. CP 100 may include any facilities necessary for it to function as a source of any type of multimedia content desired, including facilities for creating multimedia content or storing multimedia content, or both. Multimedia content can be any kind of data currently transmitted via television, radio, or the internet. Exemplary content includes news and weather channels, movies, broadcast network TV, and sports prepared by CP 100. Where it is desired to distribute multimedia content corresponding to a live event, CP 100 may include media creation facilities, such as a television or radio studio or mobile equipment for broadcasting live events at a location, e.g., a sports event, on-location news report, etc. Where the multimedia content is not live, e.g., previously recorded movies or programming for on-demand viewing, CP 100 may include facilities for storing the multimedia content, e.g., such as video or audio tape or digital storage (e.g., magnetic hard disks, DVD, etc.) on a computer server.

If desired, CP 100 may also include facilities for transmitting the created or stored multimedia content which may be any type of transmission facility capable of transmitting the desired content, such as links to a communication network (e.g., for transmitting on-demand video stored on a server), equipment for satellite transmission (e.g., for transmitting live media content), etc. However, such transmission facilities need not be used, such as circumstances, as described below, where multimedia content is delivered a third party carrier.

CP 100, as a customer to IBN 10, benefits from this invention by obtaining another means to deliver multimedia content to subscribers (e.g., end users) by increased advertising revenue included in the content, and possibly a pay-per-view or subscription revenue streams. While CP 100 could be similar to the current television and cable broadcast networks, there will be new content providers that are strictly web based.

Virtual Network

VN 200 represents a communication path between CP 100 and NOC 300 for delivering multimedia content. VN 200 may comprise any kind of communication link, including, for example, satellite and terrestrial video networks, internet or dedicated private data links, or even a $3^{rd}$ party delivery service. The geographical distance between CP 100 and NOC 300 may be a factor for choosing a specific type of VN 200. For example, a terrestrial network may be selected for a relatively short distance while a satellite link may be selected for the reception of multimedia content from a content provider of overseas. The amount of data and type of data may also be a factor for choosing the type of VN 200. For example, if multimedia content are for a live-broadcasting, the content may be delivered by a high bandwidth network such as a satellite link. However, if the content is not for live-broadcasting (e.g., video-on Express demand), the content may be delivered with slower terrestrial link. For some applications where time is not important (e.g., routine update to a stored on-demand video library), the multimedia content may be delivered via third party carriers such as FedEx, UPS, etc.

Network Operation Center

NOC 300 provides a management center for IBN 10 in which multimedia content received from CP 100 (which may be a customer of the IBN) is processed for delivery to EN 500 by (1) converting the content into a digital format (if necessary), (2) formatting the content into an IP format (if necessary), (3) encoding the content for streaming (if necessary), and (4) formatting the content for satellite transmission. NOC 300 may comprise any computer, or group of interconnected computers, that performs these functions. If the received content is in an analog format, e.g., a television broadcast, NOC 300 may convert the content to a digital format, e.g., MPEG. If the received content is not in an IP format, NOC 300 converts it into IP format. NOC 300 encodes the multimedia content for streaming format where it is not already in streaming format. Encoding for streaming format is well known in the art. The multimedia content may also be compressed with the encoding. NOC 300 further converts the format of the content received from CP 100 into a format suitable for transmission on satellite 400. For example, as described further below, NOC 300 may encapsulate the IP formatted content into a Digital Video Broadcasting ("DVB") format for satellite transmission. NOC 300 then delivers the content to EN 500 via satellite 400.

In addition, NOC 300 may store the multimedia content collected from CP 100 on the servers of NOC 300 if desired. NOC 300 also may monitor the received content for quality service.

Also, throughout the process, NOC 300 may diagnose any network malfunctions and gather network performance data for quality service. Other additional functions of NOC 300 may include, for example, providing the customer interface for managing accounts with CPs and LMSPs.

Additionally, NOC 300 may communicate with CP 100 to schedule for content acquisition and delivery. The received multimedia content from CP 100 may be classified into several categories at NOC 300 (e.g., a live broadcasting, video-on-demand, etc.) for separate delivery options. Some of the content may be stored at a memory of NOC 300 for later delivery and some of the content may be delivered instantly. Additional details of NOC 300 will be described in a later section.

Although FIG. 1 shows only one NOC 300, there may be multiple numbers of NOCs distributed geographically covering wider area. For example, one NOC may be located in Europe and another NOC may be placed in North America covering the two areas. The two NOCs may be connected with communication links, such as a private or public ATM, thereby enabling flexible movement of the content and other data between the multiple NOCs.

Satellite

Satellite 400 provides a communication link between NOC 300 and EN 500 through which streamed multimedia content may be delivered from NOC 300 to EN 500. Satellite 400 may be adapted to receive the content on an uplink from the transmitter of NOC 300 and to transmit the received content on a downlink to EN 500. This may be referred to as a forward channel. Satellite 400 may also be adapted to receive information from EN 500 on a second uplink and to transmit the received information on a second downlink to NOC 300. This may be referred to as a reverse channel. It will be appreciated that the communication channel used may be the same for the first and second uplinks and downlinks, respectively, and can be reused. Although only one satellite is shown in FIG. 1 between NOC 300 and EN 500, multiple satellites may be used making inter-satellite links to cover wider areas. Satellite 400 may be in a geostationary orbit, or other orbits may be used, and those of ordinary skill in the art will understand the additional communications overhead needed to communicate with satellites in other than geostationary orbit.

Edge Node

EN 500 provides a node for receiving multimedia content from NOC 300, and may be configured to receive multimedia content directly from satellite 400, thereby avoiding traffic delays caused by the internet. EN 500 may also be configured to accept multicast input from NOC 300. Although FIG. 1 shows only one edge node, it should be understood that the IBN of the present invention may comprise a plurality of edge nodes, where each EN 500 may be located at the "edge" of the internet backbone and as close as possible to end users. Each EN 500 may be capable of delivering received multimedia content to end users (e.g., subscribers to CP 100) through an LMSP. Each EN 500 may be co-located with an LMSP to avoid further delay caused by transmitting between EN 500 and the LMSP. An end user connected to an LMSP may access an EN 500 through his computer to receive and to view the streamed multimedia content on his computer screen.

The multimedia content downloaded from satellite 400 may be classified into several categories at EN 500 depending on the types of data (e.g., live broadcasting, video-on-demand, etc.) for separate delivery options to end users. For non-live content (e.g., video-on-demand), users may access the content stored on the EN 500 nearest to them. For live content such as news and sporting events, the content may be passed on to end users without storing it in EN 500. However, some of the streams for the live broadcasting may also be stored at a memory of EN 500 for later delivery. The multimedia servers of EN 500 are configured to deliver either live content, non-live content, or both simultaneously. The details of EN 500 will be described in a later section.

Back Channel

BC 600 provides a terrestrial communication link between NOC 300 and EN 500. BC 600 may be used for "heartbeat" information between NOC 300 and EN 500 and for communicating control commands to remotely control EN 500. Or, EN 500 may gather statistics on end users access to content and periodically provide this information to NOC 300 via BC 600 to let NOC 300 know that certain programs are still alive and operational. NOC 300 may use this information for delivery scheduling. The internet, Public Switched Telephone Network ("PSTN"), or any other private or public network may be utilized for BC 600. BC 600 may be either a one-way communication link or, a two-way communication link for more interactive operation of IBN 10.

End Users

An end user, connected to an LMSP, may access EN 500 to receive the streaming multimedia content with, for example, his personal computer or set-top box. The LMSP may provide the end user with a high speed internet connection such as DSL, ISDN, wireless or cable modem. The end user may run a streaming multimedia application (e.g., Real Network Player, Microsoft Windows Media, and Apple QuickTime etc.) to view the streaming multimedia data. Upon connection to EN 500, the end user may be provided with streaming multimedia content.

DETAILED DISCUSSION OF THE FIGURES

The operation of IBN 10 will now be described with reference to FIGS. 1 and 2 along with the flow chart of FIG. 3.

Figure 2:
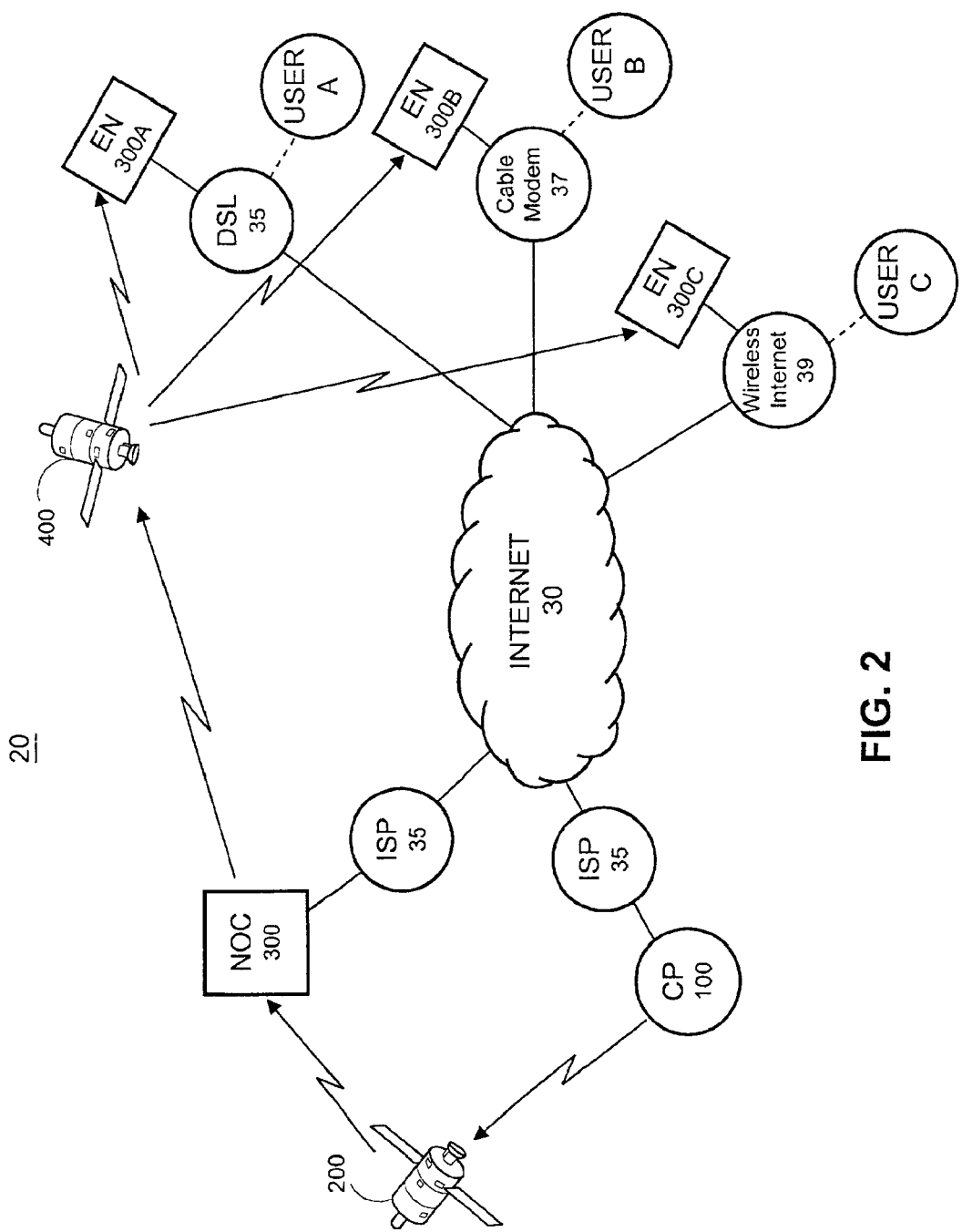
FIG. 2 is a diagram that illustrates the end to end connections of an internet broadcasting network of the present invention.

FIG. 2 illustrates the end to end connection of IBN 20 including LMSPs and end users. The same numerals are used as in FIG. 1 for CP 100, VN 200, NOC 300, satellite 400, EN 500, with the exceptions that three ENs are shown in FIG. 2 (EN 500A, EN 500B, EN 500C). The users A, B, C are each connected to the internet 30 via one of the LMSPs, for example, DSL provider 35, cable modem provider 37, wireless internet provider 39, respectively.

CP 100, trying to deliver multimedia content to its subscribers, e.g., users A, B, or C, through the internet, may request that a content delivery service be established with NOC 300. CP 100 may use any kind of communication link to contact NOC 300 to place the service request. For example, a person in CP 100 may visit the web site of IBN 20 which is designed to receive the service request, or may place a call to the manager of NOC 300.

In response to the content delivery service request from CP 100, NOC 300 schedules the reception of multimedia content from CP 100 and delivery of the received multimedia content to ENs 500A, 500B, 500C.

Figure 3:
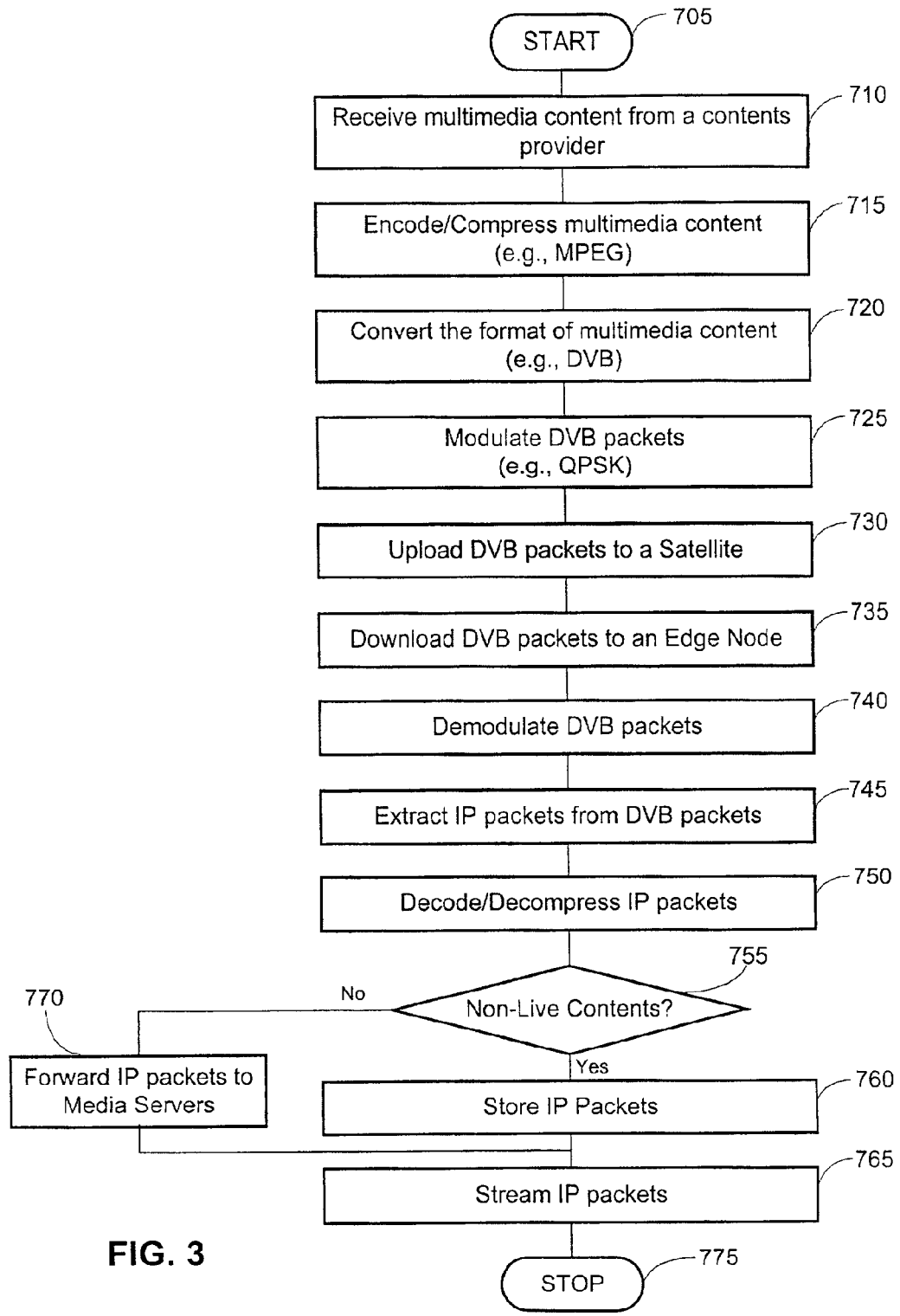
FIG. 3 is a flow chart illustrating an exemplary process of the present invention.

FIG. 3 is a flow chart illustrating an exemplary process by which IBN 20 of FIG. 2 collects multimedia content from CP 100 upon receiving a request from CP 100 and delivers the received multimedia data to the end users A, B, C.

At step 710 of FIG. 3, NOC 300 receives multimedia content from CP 100. Referring to FIG. 2, NOC 300 may receive the multimedia content from CP 100 via satellite 200. The multimedia content received from CP 100 may or may not be in an IP format. Where the content is not received in an IP format, NOC 300 may convert the content to an IP format.

At step 715, after receiving the data, NOC 300 encodes and compresses it using a streaming media standard such as, for example, MPEG, RealPlayer, or Windows Media Player format. For example, using the MPEG-2, two hour video data may be compressed into a few Gigabytes. When the multimedia content is not live, media files so encoded may be placed in a package (e.g., zip file) for transmission to EN 500. Similar packages may be used to transmit commands from NOC 300 to EN 500. A detailed explanation regarding the packages are described below.

At step 720, NOC 300 converts the format of the encoded content or packages into a format suitable for a common communication link between NOC 300 and one or more of the ENs, such as for example, Satellite 400. For example, an IP gateway of NOC 300 performs the multi-protocol encapsulation of UDP and IP packets into MPEG-2 packets for delivery of content using a digital video broadcasting ("DVB") format. The IP gateway may also put the program ID numbers ("PIDs") to indicate specific destinations of the transmitted data streams. By using the PID method, multiple content files may be transmitted simultaneously such that their packets are intermixed. Each packet has a PID number so that receiving ENs can determine what packets belong to what file. In the current example, the destinations would be ENs 500A, 500B, 500C.

At step 725, NOC 300 modulates the DVB packets. A modulator of NOC 300 modulates the DVB packets with one of the digital frequency modulation techniques for transmission via a satellite network. For example, the DVB packets may be modulated using the quadrature phase shift keying ("QPSK") modulation technology. The modulator may also encode the DVB packets for an error correction using, for example, both convolutional Viterbi and Reed Soloman block coding.

At step 730, NOC 300 uploads the DVB packets to satellite 400. Before the transmission, the transmitter may first convert the frequency of the modulated DVB packets to a radio frequency suitable for a satellite transmission.

At step 735, satellite 400 downloads the DVB packets to land-based (although an EN could also be sea, air or space based) ENs 500A, 500B, 500C of IBN 20. Satellite 400 of IBN 20 re-transmits the DVB packets downloading the DVB packets to ENs 500A, 500B, 500C. In the current example, ENs 500A, 500B, 500C are designated ENs and only these nodes may handle the DVB packets by interpreting the PID contained within the DVB packets. For example, the three ENs are designated as destination nodes by the IP gateway of NOC 300 at step 720.

At step 740, each of ENs 500A, 500B, 500C demodulates the DVB packets received from satellite 400. Each of the demodulators of ENs 500A, 500B, 500C demodulates the downloaded DVB packets. The demodulators may also down convert the radio frequency signal to an intermediate frequency ("IF") signal prior to the demodulation.

At step 745, each of ENs 500A, 500B, 500C extracts IP packets from the received DVB packets.

At step 750, each of ENs 500A, 500B, 500C decodes and decompresses the IP packets. If the IP packets are formatted with a package (e.g., a non-live content), the IP packets are extracted first before the decoding/decompressing.

At step 755, each of ENs 500A, 500B, 500C determines whether the IP packets are non-live content or live content. The process proceeds with step 760 if the IP packets are non-live content. If the IP packets are live content, the process proceeds with step 770.

At step 760, in the case of non-live content, each of ENs 500A, 500B, 500C stores the IP packets in a storage device. The multimedia content is now ready for delivery to end users A, B, C by the media servers of ENs 500A, 500B, 500C.

At step 765, media servers of ENs 500A, 500B, 500C stream the multimedia content to the end users A, B, C, respectively, through respective LMSPs 35, 37, 39. For example, users A, B, C each connected to DSL provider, cable company, and wireless internet provider receive the streams through DSL connection 35, cable modem 37 and wireless modem 39, respectively.

At step 770, in the case of live content, the media stream received via the IP packets is forwarded to the media servers of ENs 500A, 500B, 500C for immediate distribution, and the IP content is subsequently streamed to interested end users at step 765. In some cases, the live content may also be stored by ENs 500A, 500B, 500C so that the content may be made available to end users at a later time as non-live content.

Users A, B, C may request the multimedia service from CP 100 while, for example, visiting the web site of CP 100. The web site of CP 100 may be configured to receive the requests by showing available programs (e.g., video-on-demand) or time schedules for live broadcasting (e.g., sports or news, etc.). Users A, B, C may click on one of the options to receive the multimedia stream service from CP 100 by providing appropriate information (e.g., billing information or ID-password, etc). The web site of CP 100 may also be configured to determine automatically which one of ENs 500A, 500B, 500C is best able to serve the users upon receiving the service requests using, for example, an Internet Redirection Engine ("IRE"). If an EN does not have multimedia content that a user wants, the web site may direct the user to another nearest EN that has the content. Alternatively, each of the users A, B, C may visit the web site of their respective LMSPs for a request.

Beside the IBN that is in use, there may be an additional implementation of part of the IBN in which one or more of the components of the IBN are duplicated or simulated. For example, the additional implementation may include a duplicate NOC, a simulated satellite, a duplicate edge node, and a duplicate end user. Duplicate components, such as, for example, a duplicate NOC, edge node, or end user, have the same functionality and hardware and software configuration as the components they correspond to in the IBN in use. Simulated components, such as, for example, a simulated satellite, are simulated to duplicate the functionality of the components they correspond to in the IBN in use.

This additional implementation of part of the IBN may be used for off-line testing of the IBN in use. Since the additional implementation duplicates the functionality and operation of the IBN in use, the additional implementation may be used to test changes one desires to make in the IBN in use without affecting the IBN in use. By using the additional implementation, the network manager can determine, for example, how long a certain upgrade to an element of IBN in use (e.g., NOC 300, EN 500, etc.) would take and in what sequence modifications need to be performed. The effects of mixing and matching new applications may also be checked for problems before they are installed on the IBN in use. Thus the additional implementation may be used as a duplicate system for testing to help maintain the reliability of the IBN in use and minimizes service disruptions in the IBN in use.

Network Operation Center

Referring back to FIG. 1, it may be seen that NOC 300 comprises a router 302 for routing received multimedia content, a broadcast manager 304 for controlling the general operation and communicating with content providers to scheduling delivery of content from the content provider to the NOC, as described above, content storage 306 for storing received multimedia content from content providers, IP gateway 308 for converting the format of received content, servers 310 for processing the received content and uplink transmitter 312 for transmitting multimedia streams to satellite 400.

Figure 4:
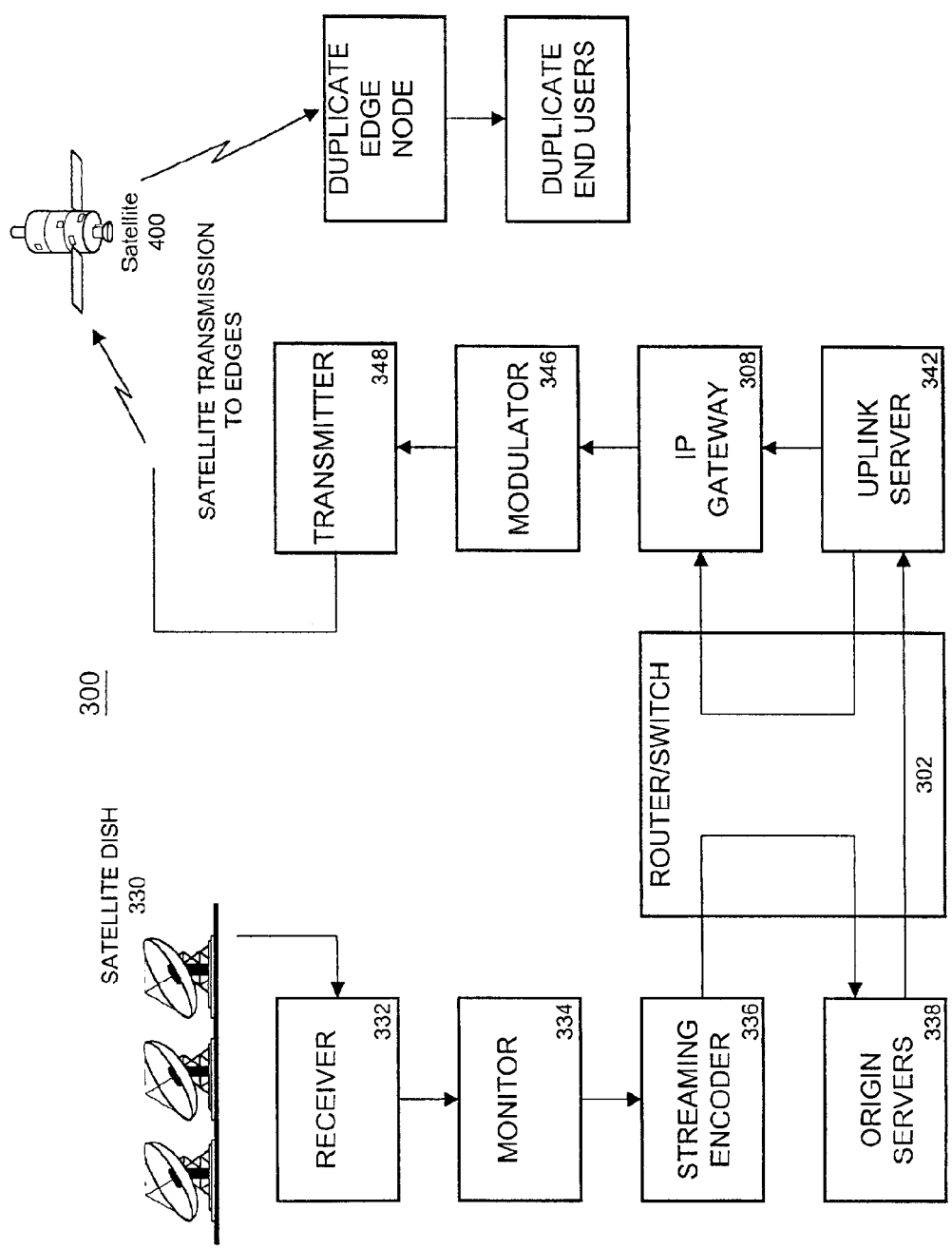
FIG. 4 is a block diagram showing an exemplary network operation center of the present invention.

FIG. 4 is a block diagram showing exemplary functional blocks of NOC 300. Here it is assumed that virtual network 200 includes satellites to receive multimedia content from CP 100.

Receiver 332 of NOC 300 acquires multimedia content from satellite dish (or dishes) 330 which may receive content from CP 100. Receiver 332, upon receiving the signals from satellite dish 330, amplifies the signal and downconverts the signal if necessary from radio frequency ("RF") to intermediate frequencies ("IF") for processing within NOC 300. Receiver 332 demodulates and decodes the signal to retrieve encoded analog video and audio when necessary. Receiver 332 next provides an output to the video/audio monitoring and processing equipment 334.

Monitor 334 of NOC 300 allows an operator to monitor the incoming signals, and to prepare the signals for input to the streaming video/audio encoder equipment 336. The output of satellite receiver 332 is applied to the amplifier (not shown) of monitor 334 providing the means for monitoring the incoming signals. Video and audio outputs may be displayed on a color video monitor and a speaker, respectively. Additionally, waveform monitors and vectorscopes of the video/audio monitoring/conditioning equipment may provide alternate means for verifying video signal quality. The output from receiver 332 also corrects the levels of the incoming signals, and provides video and audio outputs to streaming encoder 336.

Streaming encoder 336 of NOC 300 accepts content received from CP 100 and formats or compresses it, or both, into a streaming media file format such as, for example, Windows Media or RealMedia. Where the content received by encoder 336 is not in an IP format, then encoder 336 may also modify the content into an IP format. Encoder 336 then forwards the formatted and/or compressed data to origin server 338. When the content is not live, one or more of the formatted and/or encoded media files may be placed in a package for transmission to EN 500.

Origin server 338 of NOC 300 receives the packages or media files and relays them to uplink server 342 via router/switch 302. For live content distribution, Streaming Media Server Software, such as, for example, Real Server software, may be installed on origin server 338 to provide the means for accepting content from streaming encoder 336. The Streaming Media Server Software, which may have several other functions, may be configured as a push source in origin server 338 to simply push content that it receives from streaming encoder 336.

Router/switch 302 of NOC 300 may be a virtual local area network ("VLAN") to interconnect the encoders and servers of NOC 300. Multiple VLANs may exist allowing for the routing of traffic between the VLANs. Router/switch 302 may also provide the ability to interface to external networks such as private or public ATM network.

Uplink server 342 of NOC 300 receives the packages or media files from origin server 338 and re-transmits them to IP gateway 308. Streaming Media Server Software, such as, for example, Real Server, may also be installed in uplink server 342 and configured as a push splitter transmitting the packages or media files without a request from end users. This means that uplink server 342 may provide multimedia content to multiple destinations. The Streaming Media Server Software may also be configured for a scalable multicast permitting the transmission to an unlimited number of ENs with a one-way transmission, e.g., no backchannel. The Streaming Media Server Software may also be configured for Session Announcement Protocol ("SAP"), which announces the presence of these multicast transmissions to the targeted ENs. For non-live content distribution, server 342 may instead run FTP (File Transfer Protocol) or TFTP (Trivial File Transfer Protocol) server software.

It should be noted that the functionality of streaming encoder 336, origin server 338, and uplink server 342 may reside in one or more of the servers 310 of FIG. 1.

Returning to FIG. 4, IP gateway 308 of NOC 300 is a re-encapsulator. Upon receiving the packages or media files (e.g., IP packets), IP gateway 308 may encapsulate the IP packets to packets of a format designed for transmission over satellite 400, such as, for example, the digital video broadcasting (DVB) format. The DVB is an established digital video standard that permits the transmission of video, audio, and other data over a common communications link such as a satellite network. The DVB standard also permits the use of Program ID numbers (PIDs). One of the functions of the PIDs is to allow for the targeting of specific data transmissions to specific receive locations enabling a multicast input for distribution to multiple predetermined ENs.

Modulator 346 of NOC 300 accepts the encapsulated data (e.g., IP packets which have been encapsulated in DVB packets), encodes the data for error correction, and modulates the packages or media files using, for example, QPSK modulation for transmission via satellite 400. Modulator 346 may use both convolutional Viterbi and Reed Soloman block coding to affect the encoding for error correction.

Transmitter 348 of NOC 300 converts the frequency of the output of modulator 346 to radio frequency (e.g., 14—14.5 GHz) suitable for transmission via satellite 400. For example, the radio frequency equipment amplifies the upconverted signal in the high-power amplifier, then amplifies the signal again to transmit the signal to the satellite through the uplink satellite antenna 350. Transmitter 348 transmits the modulated packets to satellite 400 via a satellite transmission dish (not pictured).

NOC 300 may also include equipment that duplicates the functionality of an edge node and one or more end users. Such equipment may be used to simulate the downlink operation of an edge node and end user of IBN 20 without interfering with the operation of the edge node and end user being simulated.

The equipment in NOC 300 providing the duplicate functionality may include duplicate equipment. In other words, to duplicate the functionality of an edge node and one or more end users, NOC 300 may include all the equipment necessary to make up an edge node and one or more end users with the equipment being configured in the same manner as the edge node and one or more end users of IBN 20 whose functionality is being duplicated. Alternatively, the equipment in NOC 300 providing the duplicate functionality may include equipment that simulates the operation of an edge node and end users, such as a computer and simulation software.

With the equipment that duplicates the functionality of an edge node and end users, as described above, NOC 300 simulates the downlink operation without interfering with the systems in use, such as EN 500 and end users A, B, C.

Also, the functionality of NOC 300 may be incorporated into a portable rack which can be transported easily and does not need to be reassembled at its destination. The mobilized NOC may be equipped with the functionality of the NOC previously described above, including, for example, the encoding function to encode content to streaming media formats, such as, for example, Real and Windows media, and IP multicasting function to transmit the encoded content to multiple ENs. The operator may carry the mobilized NOC to a place where non-mobile NOC equipment cannot reach (e.g., remote mountain, remote island, etc.) for a live-broadcasting of a special event through the internet.

Edge Node

Referring back to FIG. 1, exemplary EN 500 comprises a ground antenna 502 for receiving data from satellite 400 and at least one rack 504 which includes data processing devices. Antenna 502 may be located, for example, on the roof of a LMSP premises and rack 504 may be placed, for example, inside the building. While antenna 502 and rack 504 may be connected through a coaxial cable (e.g., plenum rated RG-11 RF cable), fiber optic cable may also be used where the cable length exceeds RG-11 specification.

Antenna 502 may comprise a satellite dish with the size of the dish depending on factors including, for example, where the installation is to take place geographically. In one embodiment, a VSAT ("very small aperture terminal") with 1.2 meter (four feet) or 1.8 meter (six feet) diameter may be used. A special design method (e.g., non-penetrating roof mounts) may be used for the satellite dish to withstand strong outside winds. For example, the satellite dish may need to resist winds of 100 MPH and exert less than 20 pound per square foot on the roof. The antenna may be a "receive-only" in this embodiment. Alternatively, in another embodiment, the antenna may transmit as well.

Figure 5:
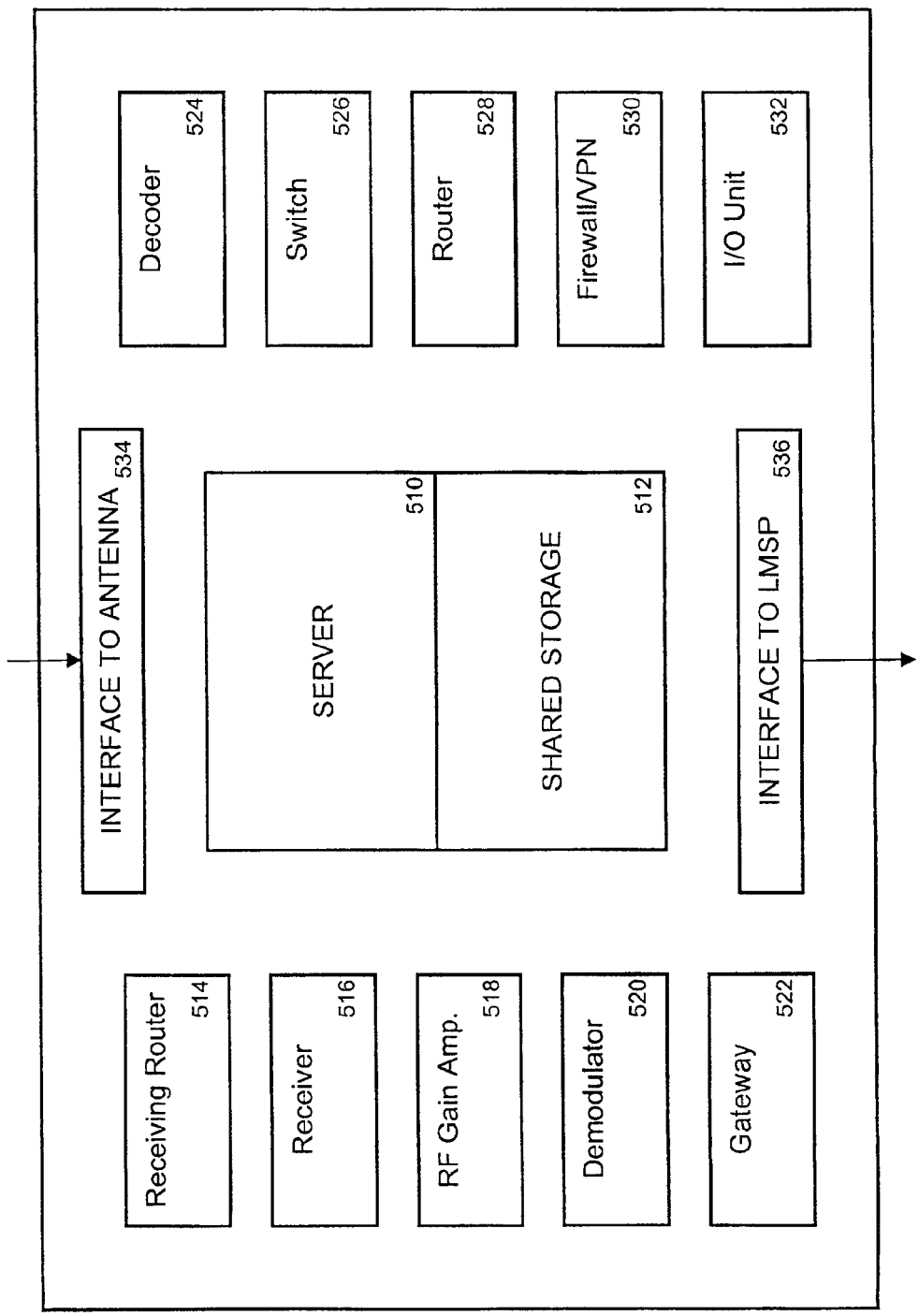
FIG. 5 is a block diagram showing functional components that may comprise an exemplary edge node of the present invention.

FIG. 5 is a block diagram of rack 504 of FIG. 1 in which examples of functional elements are illustrated. Rack 504 may comprise a server 510 capable of providing live multimedia content, non-live multimedia content, or both, shared storage 512, receiving router 514, receiver 516, RF gain amplifier 518, demodulator 520, gateway 522, and decoder 524, switch 526, router 528, firewall/VPN (Virtual Private Network) 530 and input/output unit 532.

Upon receiving a transmission from NOC 300 through receiving router 514, receiver 516 down converts the frequency for further processing. Gain amplifier 518 may then amplify the signal. Demodulator 520 demodulates the signal. Gateway 522 converts the format of the received data from a format designed for satellite transmission to an IP format. For example, where the data is received in a DVB format, then gateway 522 extracts IP packets from the DVB packets. Switch 526 and router 528 are for routing content streams to a LMSP. A human operator may input a command and view the status of the operation of EN 500 through I/O unit 532. Rack 504 may further comprise interfaces 534 and 536 to interface with antenna 502 and a LMSP, respectively.

Figure 6:
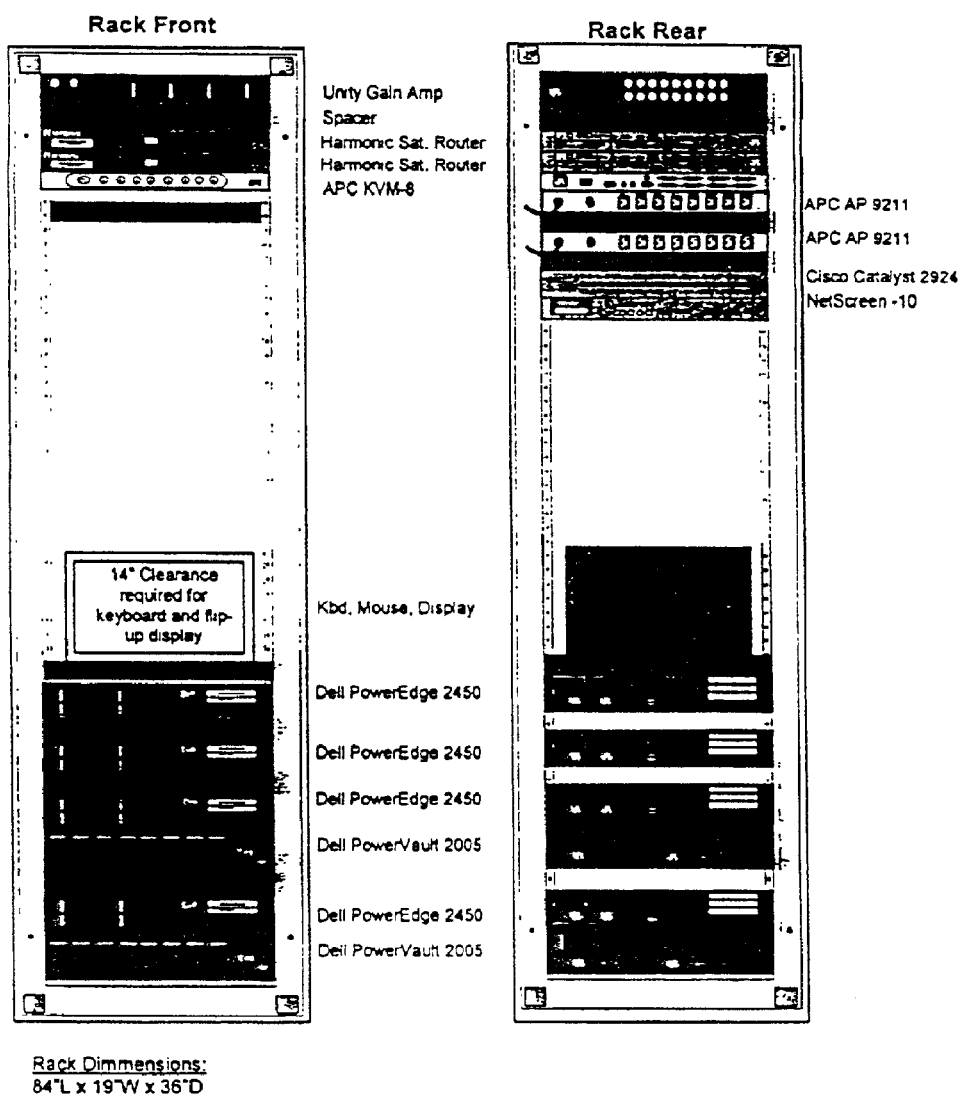
FIG. 6 shows an edge node rack configuration used in the present invention.

FIG. 6 depicts an exemplary EN rack that may comprise four dual-733 MHz Intel Pentium III processor servers (e.g., the Power Edge 2450 model server from Dell Computer Corp.), an RF gain amplifier, two satellite routers (e.g., the Enterprise1 from Harmonic Data Systems), a network switch (e.g., Model Catalyst 2924 from CISCO Systems), two remote power controllers (e.g., Model AP9211 from APC), a firewall device (e.g., model NetScreen-10 from NetScreen Technologies), multiport keyboard/display controller (e.g., model KVM-8 from APC), and keyboard/mouse/display unit. Two of the servers are configured for non-live content and the other two servers are configured for a live-broadcasting, and each has a 72 Gigabit disk array attached (e.g., the Power Vault 2005 model from Dell Computer Corp.). Alternatively, each server may be configured to send simultaneously both live and non-live content. The cabinet dimensions may be, for example, 19"×36"×84". However, any other size or number of racks may be used to accommodate the rapid growth of high speed internet users. For example, two of the racks may be used side-by-side for system expansion. For network connectivity, a total of nine 100 Mbps fast Ethernet connections may be used to the routers of the LMSP. Eight of the routers may be used to stream video to LMSPs, and the ninth may be used for the edge server switch. Alternatively, a single Gigabit Ethernet connection may be used to the LMSP routers.

Figure 7:
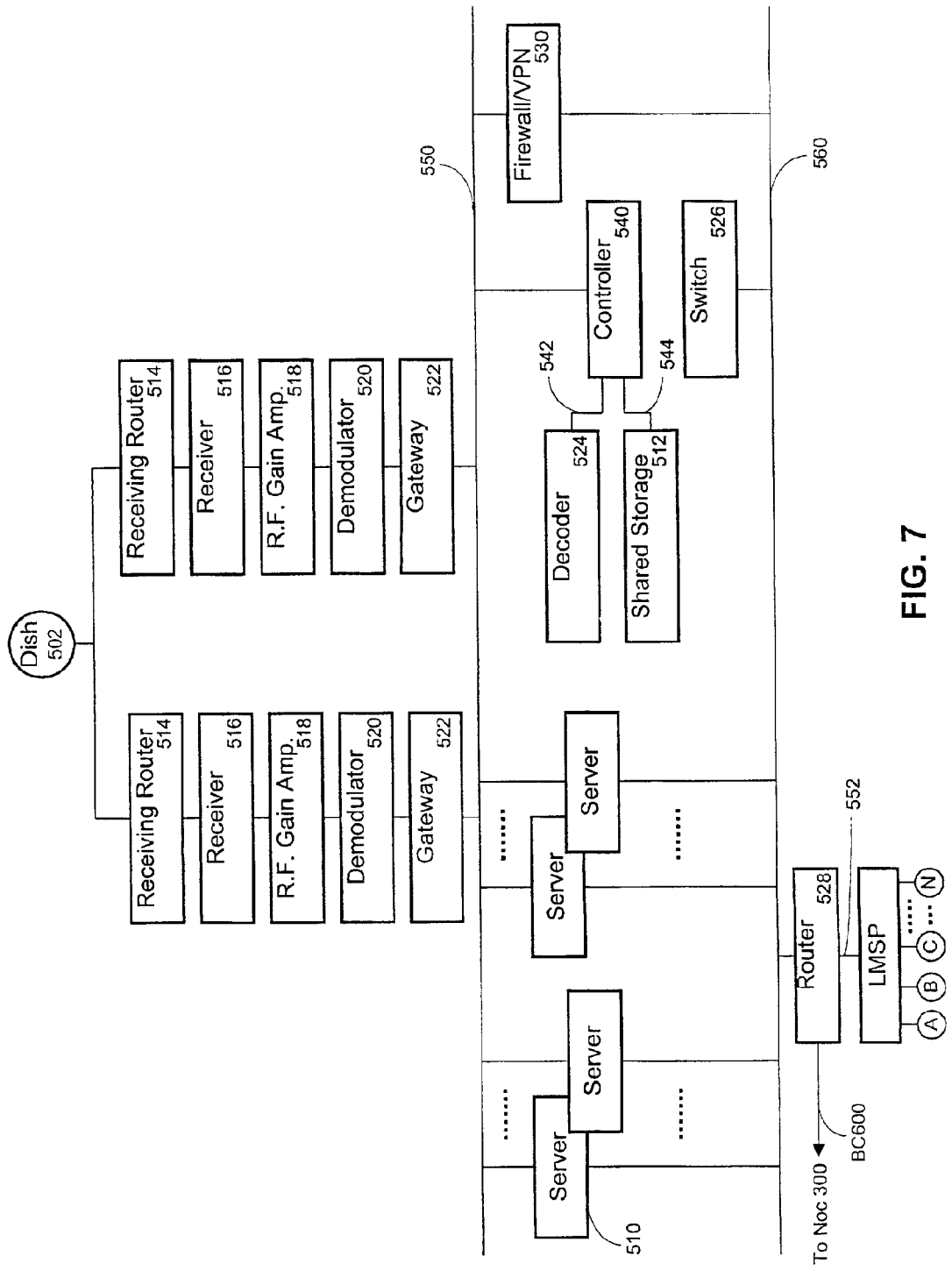
FIG. 7 is a block diagram that shows a structure of an exemplary edge node of the present invention.

FIG. 7 shows a structure of an exemplary EN 500 as an embodiment of the present invention. EN 500 contains two virtual local area networks (VLANS) 550 and 560. VLAN 550 may be called a "private" VLAN because there is no direct link from a conventional network to this VLAN from outside EN 500. VLAN 560 may be called a "public" VLAN because, as explained below, there may be a direct link from a conventional network to VLAN 560 from outside EN 500. Receiving router 514 and controller 540 are connected to VLAN 550, while router 528 and switch 526 (e.g., an optional load balancer) are connected to VLAN 560. Multimedia content (e.g., DVB packets) received from satellite 400 arrives at controller 540 via "private" VLAN 550 while multimedia content (e.g., DVB packets) received from BC 600 arrives at controller 540 via "public" VLAN 560. Media servers 510 are connected to both VLANS by, for example, two network cards/interfaces, but do not provide a thoroughfare between them. As is known in the art, through the use of VLANs, a node's broadcast domain assignment need not be determined by its physical location. VLANs may be established, for example, through the use of appropriate switches such as, for example, those of the 3Com SuperStack series, the Plaintree WaveSwitch series, and the Cisco Catalyst series.

Router 528 provides connectivity between VLAN 560 and LMSP 550 via network link 552. EN 500 of the present invention may also include firewall/VPN 530 (virtual private network) to provide connection between VLANs 550 and 560 without compromising the security of VLAN 550. A connection between the two VLANs may be made using a secure VPN thereby enabling the private side of EN 500 to be accessed from outside EN 500 for various administrative purposes.

A discrete controller 540 is used for the operation of EN 500 as shown in FIG. 7. Alternatively, the functionality ascribed to the controller 540 may be incorporated into other components of EN 500, such as, for example, one of the servers 510.

Multimedia content sent from NOC 300 to EN 500 via satellite 400 arrives at dish 502 in the form of IP format packets encapsulated within packets of a format designed for satellite transmission, such as, for example, a DVB format. Flowing through receiving router 514, receiver 516, gain amplifier 518, demodulator 520, and gateway 522, the packets are sent to controller 540 via VLAN 550. Alternatively, packets sent from NOC 300 to EN 500 via BC 600 travel through router 528 of VLAN 560, firewall/VPN 530, and then arrives at controller 540.

Each of the hardware components of EN 500 could be implemented using custom-built or commercially-available devices. For example, receiving router 514 may be implemented using a Harmonic Enterprise 1. Switch 526 (e.g., load balancer) may be implemented, for example, using a Foundry-Network ServerIron XL L4 switch. Router 528 may be implemented, for example, using a Cisco 12012, and firewall/VPN 530 may be implemented using, for example, a NetScreen Technologies' NetScreen-100. Shared storage 512 may be implemented as a JBOD Oust bunch of disks) such as, for example, the Unisys OSR700 JBOD. Shared storage device 512 could also be implemented as a redundant array of independent disks (RAID).

Each of servers 510 and controller 540 may be implemented using a standard general purpose computer or workstation, such as, for example, a PowerEdge model server from Dell Computer Corp. running Windows 2000 System Software from Microsoft Corp. or a Power Macintosh G4 model server running OS X Server Software, both from Apple Computer. Such a general purpose computer may comprise one or more processors operatively connected to memory units (such as RAM, ROM, or mass storage) containing program code and data, whereby the processor or processors may execute the program code and modify or access the data. Each of servers 510 may have two network interface cards and be running media server software such as, for example, Real System Server Software from Real Networks or Windows Media Server Software from Microsoft Corp. Controller 540 would be running data manager software crafted in accordance with the above disclosure using a computer language known in the art such as C, C++, Objective-C, or Java.

The details of multimedia content processing by EN 500 will now be described. The processing may be divided into two sections for non-live content (e.g., a package) and live content (e.g., media files).

Controller 540 runs software called a "data manager". The data manager positions non-live multimedia content on EN 500 and executes commands received from NOC 300. The data manager also allows for controlling the operation of EN 500 remotely by sending and receiving command information from NOC 300. The data manager is responsible for storing and processing packages received at controller 540 of EN 500. The data manager may also perform updates of software on EN 500, uploads log to NOC 300 reporting the control status to NOC 300, and updates the EN's registry entries.

Content received by EN 500 may be stored on one or more EN servers 510 or, on a shared storage 512 connected to controller 540 by a connection 544. Connection 544 may be made using fiber channel, IEEE 1394, Ethernet, or other connections that are known in the art. Shared storage 512 is storage shared by multiple servers 510 of EN 500. Alternatively, packages may be stored on a dedicated storage device connected to controller 540. The data manager may be run, for example, as a Java application or applet, a Windows NT service, a background application (e.g., a daemon), or as a command-line application.

FIG. 8 is a flow chart illustrating an exemplary process by which the data manager of controller 540 of EN 500 operates upon receiving a package of multimedia content.

Although a discrete controller 540 is used in this example, it is noted that the behavior ascribed to controller 540 may be incorporated into other components of EN 500, such as one of its media servers.

According to at least one embodiment of the invention, the package is addressed to controller 540 of EN 500 using IP multicast and may be received at the edge node via either satellite 400 or BC 600 depending on the speed of transmission desired. For example, if high speed transmission of the package is desired, the package may be transmitted and received over satellite 400. However, if a slower transmission speed is acceptable, the package may be transmitted and received over BC 600. As alluded to above, the package sent to controller 540 via satellite 400 arrives at satellite dish 502 in the form of UDP packets encapsulated within IP packets which are again encapsulated within DVB packets. After appropriate extraction, the package containing IP packets are sent to controller 540 via VLAN 550. Alternatively, if the package is sent to EN 500 via BC 600, the packets which make up the package travel through router 528, over VLAN 560, through firewall/VPN gateway 530, and then over VLAN 550 to controller 540.

Figure 8A:
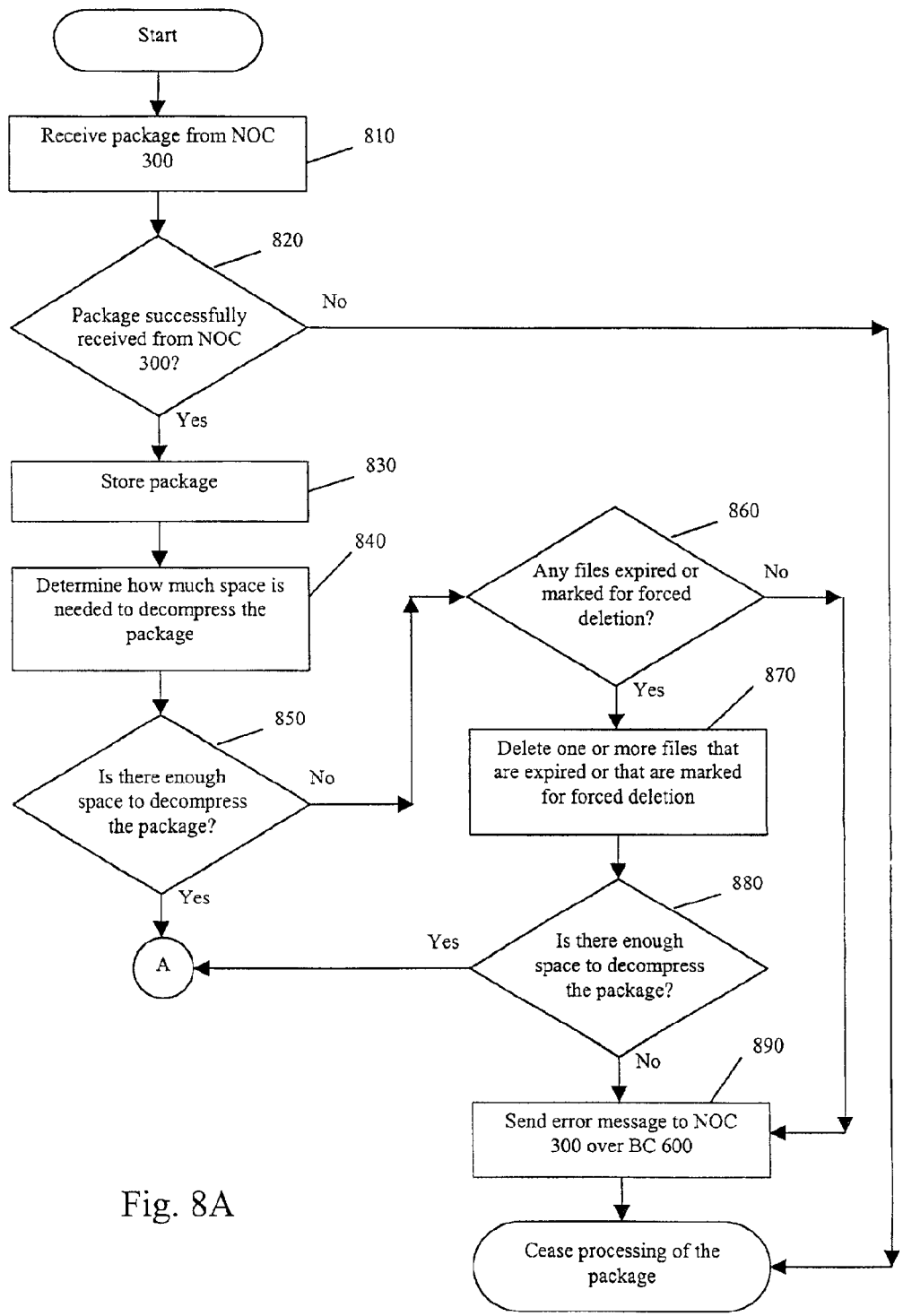
FIG. 8 is a flow chart illustrating an exemplary process of the present invention by which a data manager of a controller of edge node operates upon receiving packets from a network operation center.

Referring to FIG. 8A, a package is received from NOC 300 (step 810). At step 820, it is determined if the expected package was successfully received at controller 540.

If the package was not successfully received, the data manager may send an error message to NOC 300. Error informing messages may be sent via BC 600 using methods known in the art such as, for example, Java Message Service (JMS). Alternatively, in another embodiment no error message is sent. If the package was not successfully received, then after an error message, if any, is sent, the data manager may cease processing of the package.

If the package was successfully received, a success message may be sent to NOC 300. Alternatively, in another embodiment, no success message is sent.

Returning to FIG. 8A, regardless of whether or not a success message is sent, if the package has been successfully received at controller 540, it is stored at shared storage 512 (step 830). Then the data manager begins processing of the package by examining it to estimate how much space is required to decompress the package (step 840). Next, it is determined if there is enough space available on EN 500 to decompress the package (step 850). If there is enough space, then processing continues (Connector A) with step 900 and FIG. 8B.

Returning to FIG. 8A, if there is not enough space, the data manager consults the controller 540's database in order to determine whether any previously received files have expired or are marked for forced deletion and may be deleted from edge node storage (step 860). Depending on the controller's database, checking for expired files may be done by searching the parameter database for files whose expired field contains Boolean "true", or for files whose expiration data field contains a date which, in light of the system or network clock, indicates that the file has expired. To check for files marked for forced deletion, the data manager consults the controller's database to search for the occurrence of Boolean "true" in the "forced delete" field of database entries corresponding to files located on the node. The data manager may be designed to periodically check for and delete files that have expired or are marked for forced deletion in addition to performing this operation when a new package has arrived.

If there are no previously received files that are expired or marked for forced deletion, then there remains too little space to decompress the package and processing flows to step 890 where the data manager sends an error message to NOC 300 over BC 600 indicating this. The data manager may then cease processing the package.

If there are previously received files that are expired or marked for forced deletion, then the data manager deletes one or more of these files (step 870). Any scheme desired may be used to determine which expired files or files marked for forced deletion, or both, should be deleted. For example, the data manager may simply delete all files that are expired or marked for forced deletion.

The data manager may accomplish the deletion of a file in any number of ways. For example, a file may be deleted by both removing it from its storage space using the delete command of the operating system and by removing the file's entry in the database. Alternatively, a file's entry is not removed from the parameter database. Instead, the parameter database includes a "deleted" field for each file, and the data manager places a Boolean "true" in this field after deleting the corresponding file. Furthermore, rather than using the standard delete command of the operating system, a special delete command may be performed which prevents "un-deletion" of the file. This may be achieved by zeroing all storage positions that were occupied by the file and marking these storage positions as free. If, for any reason, an expired file cannot be deleted because, for example, the operating system indicates that the file is in use, the data manager accesses the database and places a Boolean "true" in the "forced delete field" corresponding to the file.

As noted above, EN 500 may maintain in its database information for each file concerning the package from which it came. When a file originated in a particular package is deleted, all of the files originated from that package are also deleted. The rationale employed in this concept of the invention is that a portion of a package should not be left on an EN. When only certain files of a particular package are capable of being deleted, the data manager will delete the files that are capable of being deleted and for the rest set their respective "forced delete" flags to Boolean true. Alternatively, certain files originated from a particular package may be allowed to remain while others are deleted.

Returning to FIG. 8A, after one or more expired files or files marked for deletion are deleted in step 870, another check is made to determine if there is enough space available on EN 500 to decompress the package (step 880). If sufficient space still does not exist for decompressing the package, the data manager may send an error message to NOC 300 over BC 600 indicating this (step 890) and then may cease processing of the package. If the data manager successfully frees up enough space to decompress the package, the data manager continues processing of the received package (Connector A) and flow proceeds to step 900 and FIG. 8B.

Figure 8B:
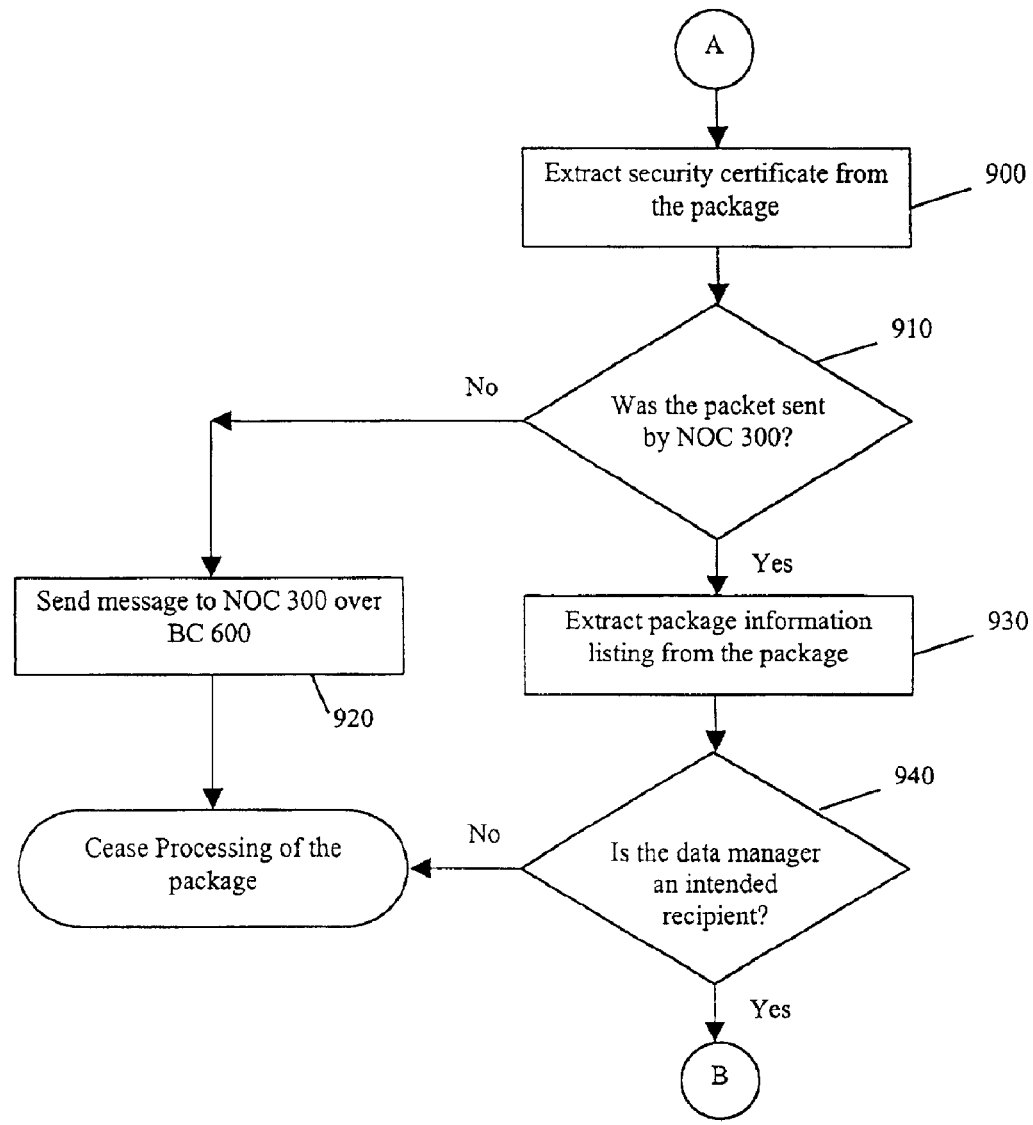
Figure 9:
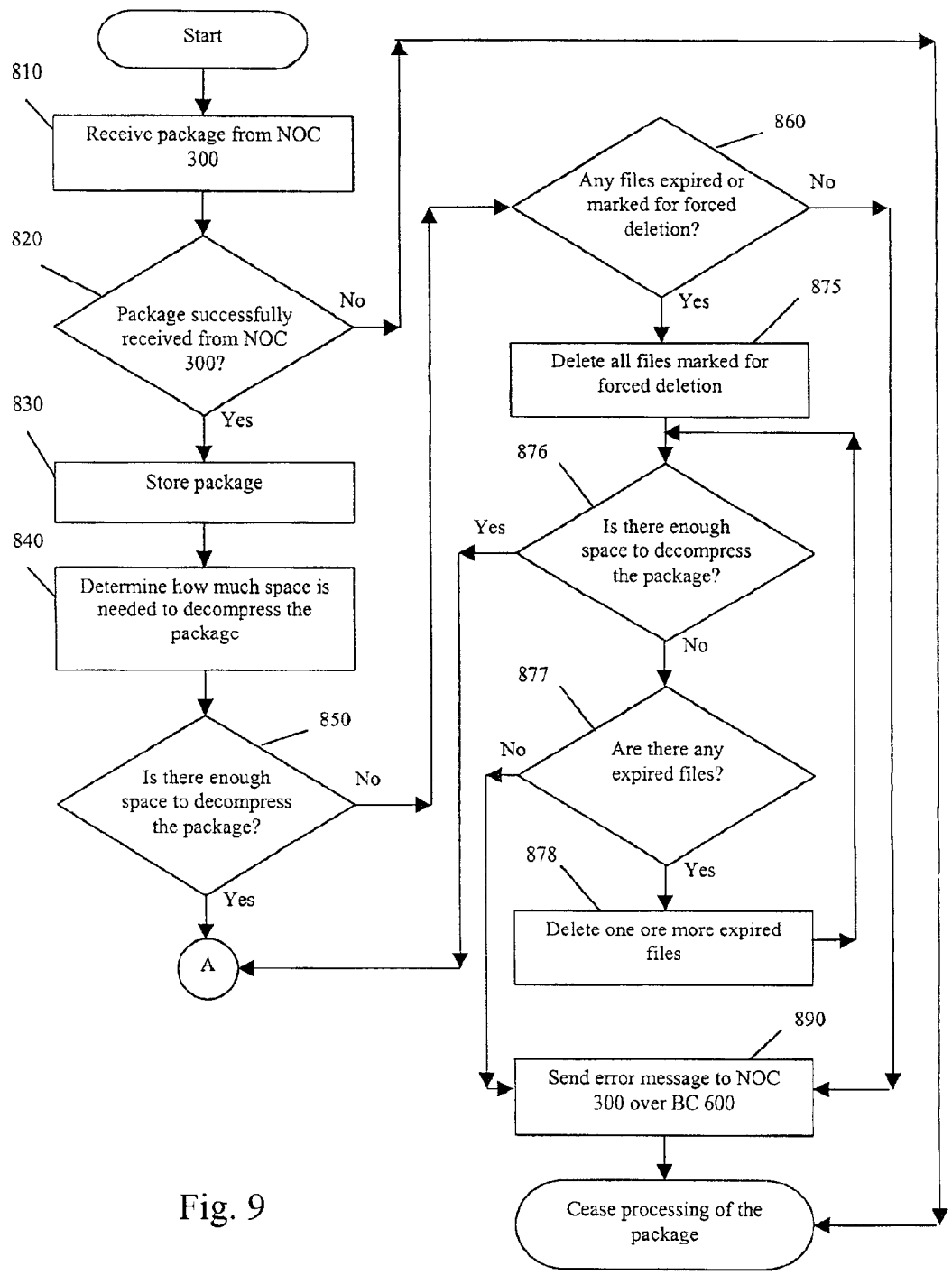
FIG. 9 is a flow chart illustrating an alternative exemplary process of the present invention.

FIG. 9 is a flow chart presenting an alternative embodiment of the present invention in which only as few files as necessary are deleted in order to free space where initially there was not enough space to decompress the package. In the flow chart of FIG. 9, steps 810 through 860 and step 890 may be performed in the same manner as the like numbered steps of FIG. 8A, described above. Referring to FIG. 9, a package is received from NOC 300 (step 810) and a check is made to determine if the package was received successfully (step 820). If the package was not successfully received, the data manager may or may not, as desired, send an error message to NOC 300 and then may cease processing of the package. If the package was successfully received, a success message may or may not, as desired, be sent to NOC 300 and then processing continues with step 830 where the successfully received package is stored. A determination is made as to how much space is needed to decompress the package (step 840) and if there is enough space then processing continues (Connector A) with step 900 and FIG. 8B. Returning to FIG. 9, if there is not enough space, then a check is made to determine if there are any previously received files that have expired or are marked for forced deletion (step 860). If there are no such files, then an error message is sent to NOC 300 over BC 600 (step 890) and processing of the package may cease.

If there are previously received files that are expired or marked for forced deletion, then the data manager may delete as few files as necessary to free up enough storage space to decompress the received package. To do that, the data manager may first delete all files marked for forced deletion (875) and then check to see if enough free space exists to decompress the package (876). If enough space exists, then processing continues (Connector A) with step 900 and FIG. 8B. Returning to FIG. 9, if not enough space exists after deleting all files marked for forced deletion, then the data manager may check if there are any previously received files that are expired (step 877). If there are expired files, then one or more expired files may be deleted (step 878) and processing flows back to step 876. If no expired files exist or there are no expired files remaining, then processing flows to step 890 where an error message is sent to NOC 300 over BC 600 and processing of the package may cease.

When deleting one or more expired files, as in, for example, step 878, different schemes may be employed to decide which files will be deleted before others. For example, the data manager may be programmed to choose to first delete files with the oldest expiration dates or files whose date of last use, as indicated by the operating system or an additional monitoring program, was the oldest.

Whether processing begins with the steps of the embodiment shown in FIG. 8A or with the steps of the embodiment shown in FIG. 9, if there is enough space to decompress the received package, either initially or after deletion of files, then processing continues with the steps of FIG. 8B where the data manager may begin decompression of the received package. Among the content of the package may be a security certificate, a package information listing, and, depending on the package type, content files or command-related files, or both. The data manager need not decompress the entire package at once and instead may extract elements from the package one by one.

Referring to FIG. 8B, at step 900, the first item the data manager extracts from a package may be the security certificate. The data manager parses the security certificate to verify that the package was indeed sent by NOC 300 (step 910). Such security certificate functionality may be implemented by procedures known in the art such as, for example, by use of the Pretty Good Privacy (PGP) encryption algorithm and associated protocols. If processing of the security certificate determines that the package was not sent by NOC 300, controller 540 may send a message advising NOC 300 of this fact over BC 600 (step 920) and may stop processing of the package. The package may then be deleted, or in other embodiments it may remain until explicitly deleted by a system administrator to allow for inspection of the of-questionable-origin package.

If the origin of the package is successfully verified, flow proceeds to step 930 where the data manager extracts from the package the package information listing. This file, which may be in XML format, may contain information, such as, for example, the package type (e.g., command or content file), identification codes of EN 500 who is one of the intended recipients of the package, the package's identification code, and the package's creation date. If the package is a content containing package, it may additionally include in the package information listing an indication of the content files contained within the package. This listing may also note for each file the file's expiration date, the server type or specific server it was meant for, and the start date for the file.

If the package is a command-containing package, then the package information file may contain one or more commands and, depending on the type of command, additional information needed for executing the command or commands such as, for example, a listing of files contained in the package which are necessary for performing an update. In other embodiments, the information listing may not contain actual commands and instead may include a listing of files within the package that contain the commands and any additional information relevant to executing the commands.

Returning to FIG. 8B, upon examining the information listing, the data manager may determine if it is an intended recipient of the file (step 940). If the data manager determines that it is an intended recipient, then processing continues (Connector B) with step 950 and FIG. 8C. Otherwise, processing of the package stops.

Figure 8C:
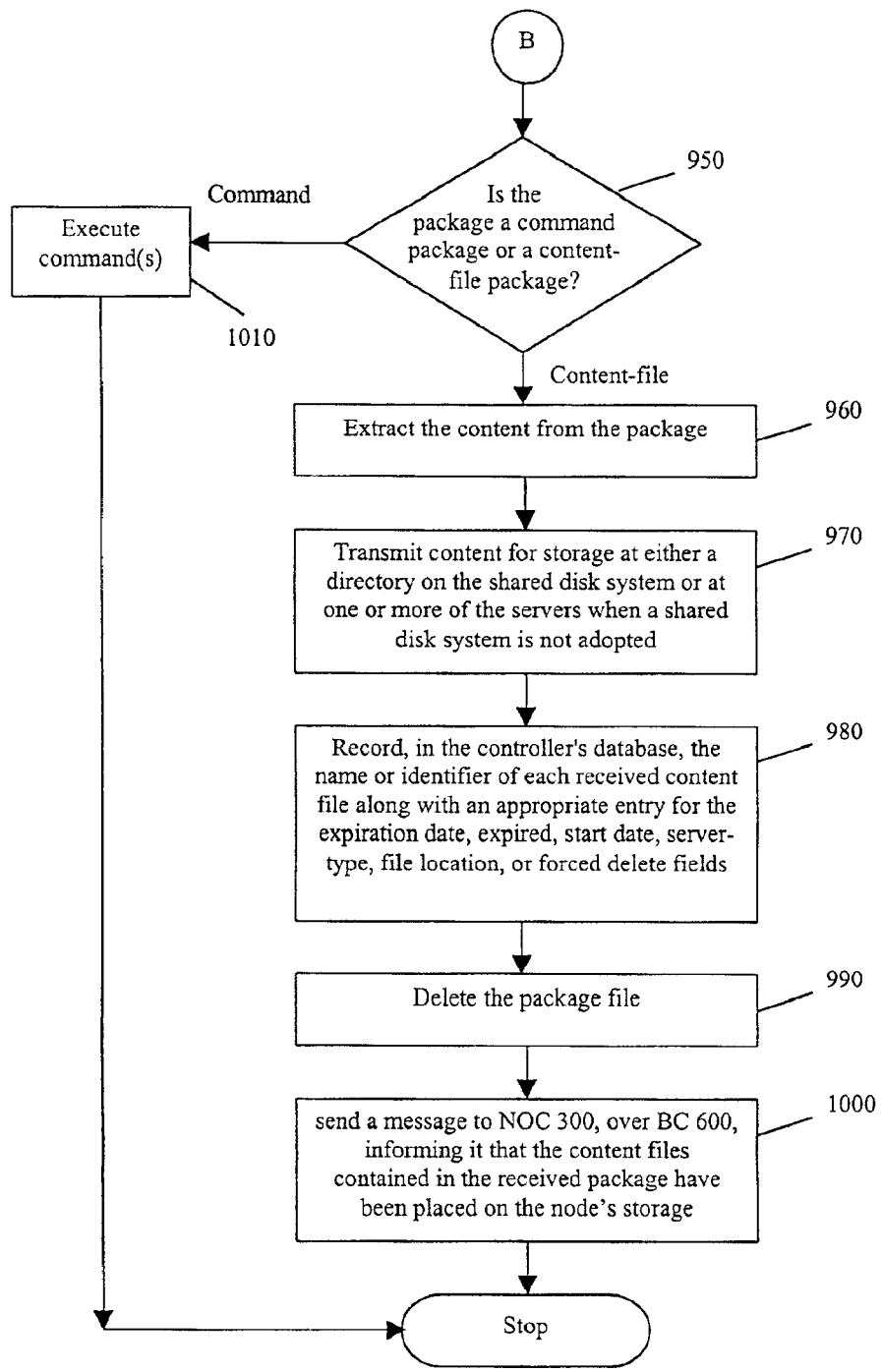

Referring to FIG. 8C, if the data manager has determined that it is an intended recipient of the package, controller 540 further examines the information listing to determine whether the package is a command package or a content-file package (step 950).

If the data manager determines that the package is a content file package, controller 540 would extract the content from the package (step 960) and transmit it to either a directory on the shared disk system or, upon one or more of the servers when a shared disk system is not adopted (step 970). Where content files are to be placed on the servers rather than on a shared disk system, the package information listing may specifically stipulate which particular servers of the edge node should receive each file contained within the package. If there is such a stipulation, then the data manger places the received files on the servers in accordance with the stipulation. However, where the content files are to be placed on the servers rather than on a shared disk system, and no placement stipulation is received from NOC 300, then the data manager has to make its own determination as to which servers should receive which files.

In order to make this determination, there are a number of factors that the data manager may be programmed to take into consideration. One factor is the server type that a particular file is meant for. For example, the data manager may be programmed to only place Real Media files onto Real Media severs. Additionally, when there exist more than one server of a particular type, the data manager may be programmed to decide how many of these servers should receive a particular file. For example, in an edge node containing three Real Media severs but no common storage, it must be decided which of these severs should receive a file of Real Media format.

Another factor the data manager may be programmed to consider is available storage space on each of the appropriate severs. For example, only a certain number of the Real Media servers may have enough storage space to receive a particular Real Media content file. Further, the data manager may be programmed to weigh competing factors. For example, choosing to place a particular content file on a greater number of servers allows a greater number of users to view a particular file simultaneously. On the other hand, this leads to being able to store fewer unique files on a particular node; from the standpoint of the total node storage, in the case where a copy of a particular content file is stored on three servers of the node one file takes up as much total room as three different files.

However, by employing shared storage device 512, the data manager would no longer need to make a decision about which servers of a particular type in an edge node should receive a particular content file. Instead, a single copy could exist on the shared storage device and be accessible by all servers that supported that file type. Thus the benefit of having the file stored at each server of a particular type would be realized without the cost of increased storage use due to there being multiple copies of particular content files.

Returning to FIG. 8C, after the content files have been extracted and sent to their target locations (e.g., a directory on the shared disk system 512 or one or more of the servers 510 if a shared disk system is not adopted), the data manager records in the controller's database the name or identifier of each received content file along with an appropriate entry for the expiration date, expired, start date, server-type, file location, and forced delete fields (step 980). The data manager then deletes the package file (step 990) and sends a message to NOC 300, perhaps over BC 600, informing it that the content files contained in the received package have been placed on the node's storage (step 1000).

As noted above, the package information listing may include information that indicates a start date and an expiration date for a content file. The controller may be programmed to not make a particular content file available to users before the start date or after the expiration date. For example, the controller may control the read privileges of a file using commands built into the operating system running on the computers of the edge node so that the servers could not read it before the file's start date or after its expiration date.

Returning to FIG. 8C, if, at step 950, the data manager determines that the package is a command package rather than a content file package, the data manager executes the command or commands contained in the package (step 1010). Described below are examples of the commands which may be received in the package including, without limitation, the following commands: Upload Logs, Software Update, Delete Content, Request File Status, Request Content, Update Settings, and Request Settings.

As mentioned above, one example of a command that may be sent to EN 500 via a package is the "UploadLogs"

command. In response the data manager uploads to NOC 300 all or part of the logs contained in the database of EN 500. Such uploading may be performed as a background process or via a thread as is known in the art. The transfer to NOC 300 may be done, for example, over BC 600 using FTP protocol. During the transfer process, the background process or thread will monitor for the success of the operation. If the transfer executes completely and successfully, the controller 546 will send a "LogTransferSuccessf" message to NOC 300. If the transfer is not successful, the controller will send a "LogTransferUnsuccessful" message to NOC 300. In other embodiments, NOC 300 may send a "LogTransferSuccessful" or "LogTransferUnsuccessful" message, as appropriate, to the controller in lieu of or in addition to the above described transmission of a message from the controller to NOC 300. Additionally, while the controller is uploading log information to NOC 300 it sends a "heartbeat" message to NOC 300 every n seconds to indicate to NOC 300 that the connection between NOC 300 and EN 500 is still active. Such messages may be sent using methods known in the art such as Java Message Service (JMS). The data manager software may record in the database of EN 500 the time and date of each attempted transmission of the log, along with an indication of whether the attempt was successful or not. Alternatively, the data manager software may only record the time and date of successful transmissions of the log.

Another example of a command is the "SoftwareUpdate" command. In response to this command the data manager acts to update itself or the software running on other components of the edge node such as its servers. When the package information listing specifies this command it also includes additional information necessary for carrying out the command. Under certain circumstances, a generalized updater program will exist on EN 500, perhaps being stored at shared storage 512, in a hard drive, or other form of storage contained within controller 540. A package information listing specifying the SoftwareUpdate command would additionally specify, as additional information, the arguments to be used by the data manager when executing the generalized software updater program. The listing may additionally specify files contained within the package that will be used by the generalized updater to perform the updating.

A specialized updater program may be provided in the command package. In such a case, a package information listing specifying the SoftwareUpdate command would specify files contained within the package to be used by the specialized updater to perform the updating.

After performing the SoftwareUpdate command, the data manager software may record in the database a notation as to whether or not the update has been performed successfully. In the case where the data manger software itself is being updated, special steps may need to be taken to make sure that the update is recorded because updating of the data manager software may necessitate ceasing execution of the program. The updater program may be designed to shut down the data manger software before updating it and the data manger software may be designed to make a "update pending" entry in the log before being shut down to be updated. The updater program could be further designed to, and after performing the update, restart the data manager software and send it a command to remove the "update pending" notation and record in the database the status (success or failure) of the update as determined by the installer. In the case that the update was unsuccessful such that the data manager program was unable to be restarted or to receive the command from the updater to make a recordation in the database, the "update pending" listing would remain in the database to provide evidence that some error had occurred.

Alternatively, the data manager software would not be instructed to make an "update pending" recording in the database before being shut down to receive an update. Instead, the updater may be designed so that, in the case that the update was unsuccessful such that the data manager program was unable to be restarted or to receive the command to make a recordation in the database, the updater may send a message to NOC 300 indicating that the update was unsuccessful and that as a result the data manager software was inoperative.

Still another example of a command is the "DeleteContent" command. When the package information listing specifies this command, the listing also includes additional information necessary for carrying out the command in the form of a listing of the identities of the content files that should be deleted. In response to this command the data manager software acts to delete the indicated file in the manner noted above.

A further example of a command is the "RequestFileStatus" command. When the package information listing specifies this command, the listing also includes additional information necessary for carrying out the command in the form of a listing of the identities of the content files whose status is requested. The listing additionally notes, for each file, the particular information requested such as the package from which the file arrived, the file's version, the expiration date of the file, whether the file's "forced delete" flag is set to true, the last time the file was accessed, the number of times the file has been accessed, and the like. In response to this command the data manager software acts to return a message to NOC 300 containing the requested information. The requested information may be collected from the database of EN 500 or by having the data manager software be designed to collect or derive the required information from the appropriate places within the edge node.

Another command may be the "RequestContent" command. This command indicates a request for the data manager software to return to NOC 300 a message containing a list of all content files and software packages stored on the edge node. The request may indicate that the data manager software should additionally return the version of content files and software packages. Alternatively, the database of EN 500 would contain titles or identifiers of all software and content files stored on the edge node along with their respective version numbers. In such an embodiment, the data manager may answer the RequestContent command by consulting the database. When none or only some of the version, title or identifier information was stored in a database, the data manager may answer the command by performing a search of the storage devices of the node, the search looking for all software and content files. As is known in the art, such searching could be done by specifying certain search criteria such as file attributes to a file search function built in to the operating system or operating systems running on the various components of the edge node. Alternatively, custom search code could be built into the data manager software. Once a particular content file or piece of software were found, its version could be determined using functions built into the system for determining file attributes. Alternatively, custom code for determining versioning information could be built into the data manager software.

A further command is the "UpdateSettings" command. When the package information listing specifies this command, the listing also includes additional information necessary for carrying out the command in the form of an indication of what devices or software of EN 500 should have their settings altered, along with a specification of the specific setting alterations that should be made. In response to this command the data manager software acts to make the specified alterations to settings of the specified devices or software. The data manager software could do this, for example, by making the specified changes to preferences or settings files associated with the devices or software or by sending, using a method known in the art such as JMS, instructions to the devices or software to change their own settings. Alternatively, messaging techniques may be used. It is specifically noted that the specified piece of software could be the data manager software itself, and accordingly the data manager could alter its own settings.

An additional command is the "RequestSettings" command. When the package information listing specifies this command, the listing also includes additional information necessary for carrying out the command in the form of an indication of what devices or software of EN 500 should have their settings reported, along with a specification of the specific setting values that are requested. In response to this command the data manager software acts to report the requested information to NOC 300 via a message as described above. The data manager software could compile the information requested by NOC 300 by, for example, reading the requested data from preferences or settings files associated with the devices or software. Alternatively, the data manager might be programmed to send, using a method known in the art such as JMS, instructions to the devices or software to report their own settings. The devices or software may be instructed to report their settings to the data manager using a messaging technique such as JMS.

EN 500 may receive commands such as those noted above via messages rather than via packages. Such messages may be sent, for example, over back channel 600. Receiving commands via messages may be in lieu of or in addition to receiving them via packages. Using the commands, NOC 300 manages and controls EN 500 without human operators.

A user wishing to view content files stored EN 500 of the present invention uses a web browser running on his personal computer or other web-enabled device to visit a web site hosted by a content provider, an LMSP or internet service provider (ISP), or another party. The website may be configured to display to the user various media files available and provide a way for a user to request viewing of a particular media file, perhaps by having the user click on an image or button or choose a selection from a pull down menu. The website could be designed so that, in response to the user's request, the user's browser issues an hypertext transfer protocol (http) "get" command to an internet redirection engine (IRE) program running on a general purpose computer located at NOC 300 or elsewhere. Alternatively, the web page may be designed to issue an http get command to the IRE without the user's explicit request. The manner of making such http get commands is known in the art.

In response to receipt of the get command, the IRE may launch a process which, as a first step, would determine the IP address of the user's machine. This can be done, for example, by examining the headers of the IP packets which comprise the http get command. The process then could employ the user's IP address in order to determine which EN or EN server is best able to meet the users request.

As noted above, NOC 300 may receive from each ENs information concerning the content files stored there and where in the EN they are stored. Using this information, the IRE can determine for any given edge node or EN server whether or not it contains the content file the user wishes to use. The IRE additionally can determine the distance (network or geographical) between a given EN or EN server and the user. This can be done in a number of ways. One way is that the IRE program can have access to a table, database, or the like which notes the relative distance between a user of a certain IP address (or with a certain IP prefix) and a given EN or EN sever. One way of compiling such a table would be to compile it by executing at the various ENs a network utility such as the Unix command "traceroute" to determine the number of network hops that occur between the edge node and certain user IP addresses (or groups of IP addresses). Ideally, the traceroute or similar program would be run remotely. Thus, for example, NOC 300 could remotely request a particular EN to run traceroute with an input parameter being a specified IP address such as the IP address of a user's machine. NOC 300 may further indicate that the EN should return a message to NOC 300 stating number of hops returned by traceroute.

Alternatively, the data manager may be programmed to make use of the Loose Source Route (LSRR) IP protocol which, as is known in the art, allows one to specify the nodes that packets must travel through to get to their destination. Doing so effectively allows one to implement traceroute-like functionality wherein one may specify both a source and destination IP address and receive in return the number of hops between the two corresponding nodes.

As another alternative, such a table could be compiled through manual entry of the geographical distances or numbers of hops between certain user IP addresses (or IP address prefixes) and certain ENs. The table may include a specific indication of EN that is known to be nearest to particular user IP addresses or to groups of IP addresses. For example, a LMSP or ISP which hosts an EN at particular internet access point may provide for inclusion in the table an indication of which user IP addresses have a direct or nearly direct connection, via an LMSP, to a particular EN.

With these two pieces of information, the IRE process can search for the EN or EN server closest to the user which contains the content file that the user requires. Ideally, this will turn out to be an EN or EN server co-located with or directly connected to the user's ISP or LMSP (e.g., EN 500A for user A, EN 500B for user B, EN 500C for user C as shown in FIG. 2). The IRE program then commands the user's browser to request, via an LMSP, streaming of the content file from the determined edge node or edge node server. As is known in the art, streaming offers functionality similar to conventional radio and television broadcast. Rather than having to, for example, download a visual program in its entirety, a user can watch a streaming file as it is transmitted to him. Accordingly, a user could view the stream using an application, browser plug-in, or the like capable of presenting streamed media, such as, for example, Real RealPlayer, Microsoft Windows Media Player, or Apple QuickTime Player.

This command to the browser may include an indication of an EN server upon which the content file exists (perhaps in the form of an IP address or DNS name) along with the name or identifier of the content file. In response to the browser executing the command, the edge node server would provide the user with the requested content file. In some cases, the server would access the file from a dedicated storage device, such a hard disk drive contained within the server. In other cases, the server would access the file from a shared disk unit.

Under certain circumstances, more than one server at the EN closest to the user has on an attached storage unit the requested file. When this situation arises, the IRE may take into consideration traffic load when deciding which of these servers to use to answer the user's request. For example, the IRE process might keep a log of how many users it has sent to one or more servers within a given period of time, and use this information to choose for the user the least busy of the servers being considered. In other embodiments, the IRE process may randomly choose among the servers with the goal of distributing requests among servers in a way that does not overly burden any particular server.

In other embodiments, the command to the browser may not direct a user's browser to a particular server on an edge node. In such embodiments, rather than decide among the various potential edge node servers, the IRE will instead determine only which closest edge node contains the needed content file and will leave it to the edge node to determine which of its one or more servers should be used to meet the request.

Such functionality may be achieved by commanding the users' browser to access a certain component of the determined EN and to indicate to that component the required file. This could be done by having the command include the IP address or DNS name of the component and the name or identifier of the required content file. In response to the browser executing the command, the edge node component would determine which of its servers to use. The EN component would then forward the browser to the chosen server which would, in turn, stream to the user the needed content file. Such a component could be implemented using a load balancing (Level 4) switch.

The multimedia content processing by EN 500 for live content is now described.

EN 300 of the present invention may also be used in the distribution of live streaming content to end users. The content stream is received at dish 502 of EN 300 as radio frequency signals carrying UDP packets encapsulated within IP packets encapsulated within packets of a format designed for satellite transmission (e.g., a DVB format) and is placed onto VLAN 550 in a manner analogous to that described above in reference to the receipt of non-live streaming content files. The packets are addressed, likely in a multicast manner, to one or more servers located in EN 500 and would thus arrive at the appropriate streaming servers via VLAN 550. Alternatively, the packets may be addressed, likely in a multicast manner, to the controller 540. The data manager program of controller 540 may be used to determine which server or servers should be receiving the stream. Such a determination might take into account usage demand such that the more popular the stream the more servers that would be allowed to receive it. The determination of popularity could be made in a number of ways. For example, the content provider could include within the stream an indication of the stream's predicted popularity. Such a prediction of popularity might also be sent from NOC 300 to the controller of EN 500 via a method such as JMS. Alternatively, the controller might make a guess as to the popularity of a stream based on factors such as the past popularity of related content, such as content from the same content provider or concerning the same topic or genre. In further embodiments, the controller might determine the popularity of the stream "on-the-fly", such that it would determine the number of users viewing the stream and adjust the number of servers receiving the stream accordingly. In either of these cases, controller 540 may send a message to NOC 300 over link BC 600 informing of the identities of the server or servers selected.

Server 510 or controller 540 of EN 500 which received a stream could determine if it were an intended recipient of the stream. One way of doing this would be to have the stream include constant or periodic identification codes which identify the stream. Server 510 or controller 540 may have access to a listing provided ahead of time by NOC 300 which noted the identification codes corresponding to the streams it was an intended recipient for during a certain time period. Server 510 or controller 540 may be programmed to ignore the packets of a stream that it was not intended to receive.

NOC 300 receives messages from various components of EN 500 informing NOC 300 of which servers are receiving which streams. This knowledge, combined with the above-described knowledge of the distances between requesting user devices and an EN, could be used by the IRE to redirect user requests for live streams to the appropriate EN in a manner analogous to the one described above in reference to non-live streaming content files. Thus, a user may request a live streaming content file via a web browser and receive the streams from an EN chosen by the IRE. The user could view the received stream using an application, browser plug-in, or the like, capable of presenting streamed media, such as, for example, RealPlayer or Apple QuickTime Player. The IRE program may redirect a user stream request to a load balancer of a particular node, and the load balancer may in turn determine which of the servers in the EN should fulfill the stream request.

While FIGS. 5–7 and related descriptions above illustrate some embodiments of an EN of the present invention, EN configuration may be altered to meet the specific needs of certain uses, markets, and the like. For example, an EN designed for use by a larger number of users may have a multitude of media servers, but no shared storage or load balancer. Each server, having its own storage device, could serve content files, streaming media, or both. The number of servers to place in the EN could be based on knowledge of the user population the node is meant for and a determination, perhaps statistical, of how many users one server can successfully provide for. As an example, it might be determined that one server should be put in place for every 500 users the node will provide for. In other words, an EN that serves about 2000 end users may contain four servers and could be implemented using a standard equipment rack as described above.

An EN designed to provide content to a small number of users (e.g., 500 or less subscribers) might have a similar configuration but differ by having only a single media server. Such an EN may be implemented in a single box using a single PC or workstation rather than the rack described above. The PC or workstation may be, for example, a Dell PowerEdge running Windows 2000 or a Power Macintosh G4 running OS X Server running media server software such as Real's RealServer or Microsoft's Windows Media Server. The PC or workstation may contain a network interface card, such as a gigabit Ethernet card, for connecting to the LMSP and a card implementing the functionality described above for receiving DVB packets via a satellite dish. For example, the Sky2PC from Digitra Systems may be used as a satellite interface card. Like the rack configuration, the single box implementation could serve content files, streaming media, or both.

An EN may be designed to be mobilized or portable. Such an EN may be implemented using an equipment rack with one or more servers as described above. Preferably, the equipment rack would be strengthened using secure mountings and reinforcing rods and would include worldwide power connections. Such an EN may be implemented using a PC or workstation with a satellite interface card as described above. These configurations allow the EN to be carried easily and require little or no reassembly when placed at a site. Such a portable EN may be used to provide a temporary EN service at an area that is not served by a regular EN. The portable EN may be connected instantly to a LMSP for the streaming service.

However, such an EN may or may not be connected to a LMSP for the final delivery to end users. When the mobilized EN is connected to a LMSP, the configuration may be similar to that of a regular EN as discussed above. However, when there is no LMSP available at an area, the mobilized EN may be configured to deliver multimedia data directly to end users, without the need for an LMSP. This could be done using a wireless method such as, for example, IEEE 802.11 or a wired method such as Ethernet.

Such wireless capability can be implemented by adding to the EN IEEE 802.1-compliant equipment from Lucent Technologies. As an example, in the case where the EN is implemented using a single PC or workstation, a IEEE 802.11 compliant PCI card may be used in conjunction with routing software. As another example, in the case where the EN is implemented using an equipment rack, an IEEE 802.11 compliant router may be used. End users would have IEEE 802.11 compliant interfaces in their viewing equipment. When a wired method such as Ethernet is used, the EN may be implemented using a single PC or workstation with several Ethernet cards and routing software. When a rack configuration is used, a router may be included.

The mobilized EN may be equipped with an integrated display screen to receive and show live multimedia data to the audience of an event such as a trade show. Such a "demonstration" edge node may not necessarily include networking hardware for connectivity to an LMSP or directly to end users. As an example, one or more of the servers may be further equipped with client viewing software such as, for example, Windows Media Player or RealPlayer, and a video card for interfacing with the display screen whereby the client software may interface with the server software and ultimately display multimedia content on the display screen. Alternatively, when the rack configuration is used, an additional PC or workstation may be added to the rack for receiving content from one or more of the servers. The additional PC or workstation would run client software as above and would include a networking card for interfacing with one or more of the servers and a video card for interfacing with the display screen. Alternatively, the demonstration EN may be implemented using a single PC or workstation with a satellite interface card in a manner similar to that described above with reference to the portable EN and the EN for a small user population. However, the single PC or workstation may additionally include a video card for interfacing with the display screen and may not necessarily include networking hardware for connecting to end users or an LMSP. In the demonstration EN embodiments described herein, the display screen could be a standard computer display such as a VESA-compliant display, an NTSC compatible display, or the like. The card could be a PCI card compatible with the chosen display, such as a VESA-compliant card with an HD 15 connector or an NTSC compatible card with RCA-type connectors. The demonstrator may have multiple display screens, each capable of displaying unique content. An instance of the client viewing software may be executed and a video card may be included for each of the multiple displays.

An EN may be implemented so that its user capacity may be increased or decreased over time by including a load balancer and a shared storage. Media servers of the EN are usually connected to the load balancer (e.g., L-4 switch) to distribute the load equally to the multiple servers. Since the media servers do not hold the content, the servers may be added or removed instantly (e.g., on-the-fly) while the EN is operating. For example, if the number of end users is increased during the operation of the EN, the servers may be added instantly. If the number of end users is decreased during the operation of the EN, the servers may be removed instantly. As will be evident to those skilled in the art, such scalability is possible because the load balancer will balance demand over whatever number of servers exist on the EN, and the shared storage means may be added or removed without affecting the availability of particular content files. The inclusion of the load balancer and shared storage provides additional benefits by allowing user demands upon the EN to be intelligently spread among the available servers, thereby preventing the EN from having to worry about which content files should be stored on which particular servers.

OTHER MANAGEMENT

Specialized File Naming System

A protocol will be employed for the naming of content files whereby examination of the file name will allow determination of certain data concerning the file. CP 100 will be provided with the naming protocol and will responsible for naming content files in accordance with the protocol before transmitting them to NOC 300. Alternatively, NOC 300 will be responsible for assigning files names that are compliant with the established protocol.

Among the information that may be encoded in the file name generated in accordance with the protocol are: a description of the content contained within the file; the identity of the content provider or content provider subgroup; the method of delivery to NOC 300 or EN 500 (e.g., satellite, wire network, wireless network, FedEx hand delivery); the facility where the content was encoded; the encoding format (e.g., RealPlayer); the encoding bit rate; and the identity of the machine or person who performed the encoding, etc.

For example, the protocol might establish that content file names possess the format such as "ContentProvider_ContentProviderSubgroup-EncodingFacility_ContentDescription-Bitrate.format".

For example, "AcmeMedia_FunChannel-SomeProviderNY_LearningSoccer0973-300.rm" indicates that the content provider is Acme Media, the content provider subgroup is the Fun Channel, the file was encoded at Acme Media's New York encoding facility, that the content is episode 97 of Learning Soccer, that the file was encoded at 300 Kbps, and that the file format is RealPlayer.

Employment of a naming protocol such as this allows for easy file tracking, maintenance, identification, and the like in the system by allowing a great deal of information concerning a file to be derived from its name alone.

Note that the entire file name need not be assigned a name in accordance with the naming protocol. Rather, only a portion of a file name may be chosen, as desired, to implement the naming protocol, e.g., the first 10 characters of the file name, etc.

Specialized IP Addressing Protocol

As is known, one portion of the IP address assigned to a network component such as a server, router, workstation, or the like is stipulated by a governing body, while a second portion of the IP address is chosen by someone such as the network administrator responsible for the network to which the component is attached. Accordingly, the specifiable portion of the IP addresses of network components located in NOC 300, EN 500 and elsewhere may be chosen according to a protocol so that examination of the specifiable portion of a component's IP address will allow determination of certain information concerning the component.

Among the information which may be encoded into an IP address according to the protocol is information concerning the function, identity, location, hardware, operating system, installed software, hardware or software version, and the like of the network component to which the IP address is assigned. For example, as is known in the art, class B IP addresses take the form of "a.b.c.d" where each of "a", "b", "c" and "d" are numbers ranging between 0 and 255, and "a" and "b" are stipulated while "c" and "d" are specifiable.

The protocol might establish a bank of values ranging from 0 to 255 wherein for each value there is a corresponding hardware description. For example, code "001" correspond to "RealMedia server: Dell PowerEdge 6450, Windows 2000" while code "151" may correspond to "Foundry Networks ServerIron XL Load Balancing L4 Switch". When assigning a class B IP addresses to a network component, the protocol may specify that the "c" value be chosen according to the bank of values and that the "d" value be chosen to be an identification number for the component. For example, according to the protocol a component may be assigned the IP address of "172.17.151.003" indicating that the component was the third Foundry Networks ServerIron XL Load Balancing L4 Switch among components whose stipulated IP address portion is "172.17". Similarly, the component IP address of "172.16.001.005" may indicate that the component was the fifth RealMedia server based on a Dell PowerEdge 2450 using the Windows 2000 operating system among components whose stipulated IP address portion is "172.16".

The functions described above of assigning IP addresses to network components may be implemented by computer code.

Integrated Network Management System

Two components used in IBN 10, 20 are broadband IP gateway and broadband receiver/router. The IP gateway performs the multi-protocol encapsulation of IP datagrams into, for example, MPEG-2 packets for delivery of IP data over, for example, DVB transport streams. It seamlessly integrates IP capabilities into existing MPEG-2 video networks, such as HFC, satellite, or wireless. The broadband receiver delivers received content streams to the VLAN's of EN 500. IBN 10, 20 utilizes IP gateways in its uplink network to convert IP streaming data to, for example, DVB transport streams and multicast DVB streams through satellites to the broadband receivers in EN 500.

In addition to managing traditional IP networks, another challenge is to integrate the broadband streaming device management with off-shelf network management software (e.g., HP Open View and Spectrum). The application for the integration is referred to as an integrated element manager system. The application utilizes simple network management protocol (SNMP) and collects data from IP gateways and broadband receivers. With the application, operators can easily manage IBN 10, 20 from one user friendly system. By tightly integrating these two elements of IBN 10, 20, IP gateways and broadband receiver, with network management system, the element manager provides operators an effective way to safeguard the quality and reliability of the network. The integrated manager system is used in the following four major areas of the network management.

System Monitoring:

System monitoring includes data collection, event correlation and alarm management. From the operation console, operators will visualize the IP gateways and broadband receivers up down status through a high-level graphic user interface. Operators will be able to navigate to a low level and view current device configuration information as well as device performance information. The device configuration information includes serial number, version number, location, IP address, Max PIDs service, satellite frequency setting a list of PID value and its associated applications, current signal lock status, etc. The device performance information includes Input BER (bit error rate), Eb/No, Packet throughput, each PID throughput, Lock, Fades, Syn err, etc.

Thresholds will be set on some of monitoring data points. For example, if packet throughput is zero in the receiver, a critical alarm must be triggered immediately in the NMS system indicating the receiver has stopped processing traffic. If Eb/No drops, the system will alarm operators the device has problem locking on the signal.

The alarms may be tightly integrated with the alarm notification system of the off-shelf network management package. It enables the operator to take corrective action promptly. An action process will be integrated into the alarm system that decides when to generate trouble tickets, who trouble tickets will be assigned to, etc.

Fault Isolation:

Based on logged events, the system will diagnose system behavior that might cause problems and reduce system downtime significantly. For example, the system can compare PID values in IP gateways and in broadband receivers to determine if the cause of no PID throughput in the receiver is the incorrect PID value in the receiver.

System Configuration and Management:

From an operation console, operators will be able to launch a system configuration screen by selecting one submenu from the off-shelf network management package. Through the interface of the integrated manager system, the operator may be able to set the configuration on the IP gateways and broadband receivers. The configuration includes assigning PID, frequency, symbol rate, etc.

Operators may also have the option of upgrading software on selected devices automatically. The option is very valuable in a distributed network like IBN 10, 20 because the operators manage hundreds and thousands of broadband receivers remotely.

Performance Statistics Collection and Reporting:

Collected data is stored in the database. Integrating IP gateway and broadband receiver performance data with overall network performance data provides operators an accurate picture of IBN 10, 20 network availability and service availability. Operators may be able to view the device problem report, availability report and performance report over a set time period. In addition, they will be able to view the overall network availability and performance report including IP gateway and broadband receivers' statistics.

The many features and advantages of the present invention are apparent from the detailed description, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A system for delivering multimedia content from a content provider, the system comprising:

a first Internet broadcasting network ("IBN"); and a second IBN;

where the first IBN comprises:
   a network operating center ("NOC");
   an edge node;
   a satellite communication link between the NOC and the edge node;
   a last mile service provider directly connected to the edge node; and
   an Internet user connected to the Internet through the last mile service provider;
   where the NOC receives multimedia content from the content provider and modifies the received multimedia content into a first streaming format and a format suitable for satellite transmission;
   where the NOC transmits the modified multimedia content to the edge node using the satellite communication link; and
   where the edge node delivers the modified multimedia content received from the NOC to the Internet user via the last mile service provider according to a second streaming format compatible with the first streaming format;

where the second IBN comprises:
   duplicates of one or more of the NOC, the edge node, the satellite communication link, the last mile service provider, or the Internet user of the first IBN; and
   simulations of one or more of the NOC, the edge node, the satellite communication link, the last mile service provider, or the Internet user of the first IBN for which the second IBN does not comprise a duplicate;
   where the second IBN is used to simulate the operation of the first IBN without interfering with the operation of the first IBN.

2. The system of claim 1, where the second IBN comprises:
   a duplicate of the NOC of the first IBN;
   a duplicate of the edge node of the first IBN;
   a duplicate of the last mile service provider of the first IBN;
   a duplicate of the Internet user of the first IBN; and
   a simulation of the satellite communication link of the first IBN.

3. The system of claim 1, where the second IBN comprises:
   a duplicate of the NOC of the first IBN;
   a duplicate of the edge node of the first IBN;
   a simulation of the last mile service provider of the first IBN;
   a simulation of the Internet user of the first IBN; and
   a simulation of the satellite communication link of the first IBN.

4. The system of claim 1, where the second IBN is contained in a portable enclosure.

5. The system of claim 1, where the performance of the first IBN is tested using the second IBN by injecting errors into signals received at the NOC of the second IBN.

6. The system of claim 1, where the performance of the first IBN is tested using the second IBN by injecting errors into signals received at the edge node of the second IBN.

7. The system of claim 1, where the performance of the first IBN is tested using the second IBN by injecting errors into signals received at the Internet users of the second IBN.

8. The system of claim 1, where the second IBN is used to simulate the delivery of content in the first IBN.

9. A method for testing a first Internet broadcasting network ("IBN") that delivers multimedia content from a content provider, where the first network comprises:
   a network operating center ("NOC");
   an edge node;
   a satellite communication link between the NOC and the edge node;
   a last mile service provider directly connected to the edge node; and
   an Internet user connected to the Internet through the last mile service provider;
   where the NOC receives multimedia content from the content provider and modifies the received multimedia content into a first streaming format and a format suitable for satellite transmission;
   where the NOC transmits the modified multimedia content to the edge node using the satellite communication link; and
   where the edge node delivers the modified multimedia content received from the NOC to the Internet users via the last mile service provider according to a second streaming format compatible with the first streaming format;

the method comprising:
providing a second IBN that comprises:
   duplicates of one or more of the NOC, the edge node, the satellite communication link, the last mile service provider, or the Internet user of the first IBN; and
   simulations of one or more of the NOC, the edge node, the satellite communication link, the last mile service provider, or the Internet user of the first IBN for which the second IBN does not comprise a duplicate;
   simulating the operation of the first IBN using the second IBN without interfering with the operation of the first IBN.

10. The method of claim 9, where the second IBN comprises:
   a duplicate of the NOC of the first IBN;
   a duplicate of the edge node of the first IBN;
   a duplicate of the last mile service provider of the first IBN;
   a duplicate of the Internet user of the first IBN; and
   a simulation of the satellite communication link of the first IBN.

11. The method of claim 9, where the second IBN comprises:
   a duplicate of the NOC of the first IBN;
   a duplicate of the edge node of the first IBN;
   a simulation of the last mile service provider of the first IBN;
   a simulation of the Internet user of the first IBN; and
   a simulation of the satellite communication link of the first IBN.

12. The method of claim 9, where the second IBN is contained in a portable enclosure.

13. The method of claim 9, where the simulating of the operation of the first IBN comprises injecting errors into signals received at the NOC of the second IBN to test the performance of the first IBN.

14. The method of claim 9, where the simulating of the operation of the first IBN comprises injecting errors into signals received at the edge node of the second IBN to test the performance of the first IBN.

15. The method of claim 9, where the simulating of the operation of the first IBN comprises injecting errors into signals received at the Internet user of the second IBN to test the performance of the first IBN.

16. The method of claim 9, further comprising monitoring the second IBN to detect quality degradation in the first IBN.

* * * * *